(12) United States Patent
Sqalli et al.

(10) Patent No.: US 9,739,950 B2
(45) Date of Patent: Aug. 22, 2017

(54) METHOD TO OPTIMIZE A LIGHT COUPLING WAVEGUIDE

(71) Applicant: CSEM Centre Suisse D'Electronique et de Microtechnique SA-Recherche et Developpment, Neuchatel (CH)

(72) Inventors: Omar Sqalli, Munich (DE); David Pires, Allschwil (CH); Guillaume Basset, Huningue (FR); Martin Stalder, Oberwil (CH)

(73) Assignee: CSEM CENTRE SUISSE D'ELECTRONIQUE ET DE MICROTECHNIQUE SA-RECHERCHE ET DÉVELOPPEMENT, Neuchâtel (CH)

( * ) Notice: Subject to any disclaimer, the term of this patent is extended or adjusted under 35 U.S.C. 154(b) by 126 days.

(21) Appl. No.: 14/416,272

(22) PCT Filed: Jul. 24, 2013

(86) PCT No.: PCT/EP2013/065631
§ 371 (c)(1),
(2) Date: Jan. 21, 2015

(87) PCT Pub. No.: WO2014/016343
PCT Pub. Date: Jan. 30, 2014

(65) Prior Publication Data
US 2015/0219842 A1    Aug. 6, 2015

(30) Foreign Application Priority Data

Jul. 25, 2012 (WO) .................. PCT/EP2012/064634

(51) Int. Cl.
G02B 6/34       (2006.01)
B29D 11/00      (2006.01)
G02B 6/293      (2006.01)
G02B 6/27       (2006.01)
B29L 11/00      (2006.01)

(52) U.S. Cl.
CPC .......... *G02B 6/34* (2013.01); *B29D 11/00692* (2013.01); *B29L 2011/0075* (2013.01);
(Continued)

(58) Field of Classification Search
None
See application file for complete search history.

(56) References Cited

U.S. PATENT DOCUMENTS 5,420,947 A * 5/1995 Li ............................ G02B 6/34
                                                        359/569
6,219,478 B1    4/2001 Parriaux
(Continued)

FOREIGN PATENT DOCUMENTS

FR          2 942 549 A1    8/2010
WO    WO 2005/103771 A1   11/2005

OTHER PUBLICATIONS

International preliminary report on patentability for PCT/EP2013/065631, dated Dec. 18, 2014.*

(Continued)

*Primary Examiner* — Mike Stahl
(74) *Attorney, Agent, or Firm* — Koppel, Patrick, Heybl & Philpott

(57) ABSTRACT

The present invention concerns a method for constructing a light coupling system wherein a grating is manufactured on the surface of a multimode waveguide and defines the entrance of the waveguide for an incident light beam, said grating comprising a repetition of patterns. The grating is defined by a set of parameters comprising: •grating period (P), separating two adjacent patterns, •grating depth (d) between the highest and the lowest point of the pattern, •incident angle mean value (θ) of the incident light with respect to the waveguide. The method comprises a step of optimization of the set of parameters to obtain an optimized second set of parameters, in order to obtain a transmission efficiency (Ce) of the incident light into said waveguide for (Continued)

the first or the second diffractive order exceeding 35% for unpolarized light, or exceeding 50% for polarized light, at a given wavelength of the incident light.

23 Claims, 21 Drawing Sheets

(52) U.S. Cl.
CPC ........ *G02B 6/2793* (2013.01); *G02B 6/29323* (2013.01); *G02B 6/29329* (2013.01); *G02B 6/29397* (2013.01)

(56) References Cited

U.S. PATENT DOCUMENTS

| | | | | |
|---|---|---|---|---|
| 7,454,103 | B2* | 11/2008 | Parriaux | G02B 5/1814 |
| | | | | 359/369 |
| 2005/0002611 | A1* | 1/2005 | Levola | G02B 6/105 |
| | | | | 385/37 |
| 2005/0094939 | A1* | 5/2005 | Ghiron | G02B 6/12007 |
| | | | | 385/36 |
| 2010/0277803 | A1* | 11/2010 | Pockett | G02B 27/4277 |
| | | | | 359/567 |
| 2010/0322555 | A1* | 12/2010 | Vermeulen | G02B 6/12007 |
| | | | | 385/28 |
| 2014/0044393 | A1* | 2/2014 | Magnusson | G02B 6/34 |
| | | | | 385/37 |

OTHER PUBLICATIONS

Roelkens G; Van Thourhout D; Baets R: "High efficiency silicon-on-insulator grating coupler based on a poly-silicon overlay". Optics Express. vol. 14. No. 24. Dec. 2006 (Dec. 2006). pp. 11622-11630. XP002696024. USA p. 11623. line 4-line 27; figure 6.

Alonso-Ramos C; Ortega-Monux A; Halir R; Zavargo-Peche L; Molina-Fernandez I; Cheben P; Xu D-X; Janz S: "Grating couplers in thick rib SOI waveguides for TE and TM polarizations". Silicon Photonics and Photonic Integrated Circuits III—Proceedings of The SPIE—The International Society for Optical Engineering. vol. 8431. Apr. 19, 2012 (Apr. 19, 2012). pp. 84310E-1-84310E-7. XP002696025. Belgium figure 8.

Maire G et. al.: "High efficiency silicon nitride surface grating couplers". Optics Express. vol. 16. No. 1. Jan. 4, 2008 (Jan. 4, 2008). pp. 328-333. XP002696026. USA figures 1.2.

M. G. Moharam and T. K. Gaylord: "Diffraction analysis of dielectric surface-relief gratings". School of Electrical Engineering, Georgia Institu~e of Technology, Atlanta, Georgia 30332; vol. 72, No. 10/Oct. 1982/J. Opt. Soc. Am.; pp. 1385-1392.

Li Zhu, Vadim Karagodskya, and Connie Chang-Hasnaina: "Novel High Efficiency Vertical to In-plane Optical Coupler". Department of Electrical Engineering and Computer Sciences, University of California at Berkeley, Berkeley, CA 94720, USA; Downloaded From: http://proceedings.spiedigitallibrary.org/ on Dec. 4, 2014.

Janyce Franc, Nathalie Destouches, Danièle Blanca, Jean-Claude Pommiera, Svetlen Tonchev Geert Van Steenberge, Nina Hendrickx, Arndt Last, Olivier Parriaux:"High efficiency diffraction grating coupler for multimode optical interconnect", Micro-Optics, VCSELs, and Photonic Interconnects II: Fabrication, Packaging, and Integration, edited by H. Thienpont, M. R. Taghizadeh, P. Van Daele, J. Mohr, Proc. of SPIE vol. 6185 61851F, (2006) Proc. of SPIE vol. 6185 61851F-1 Downloaded From: http://proceedings. spiedigitallibrary.org/ on Dec. 4, 2014.

N. Destouches, D. Blanc, J. Franc, S. Tonchev, N. Hendrickx, P. Van Daele, O. Parriaux: "Efficient and tolerant resonant grating coupler for multimode optical interconnections". Dec. 10, 2007 / vol. 15, No. 25 / Optics Express 16870.

\* cited by examiner

| Color target [nm] | Medium Level Optimization | | | High Level Optimization | | |
|---|---|---|---|---|---|---|
| | BLUE 460-485nm | GREEN 560-590nm | RED 600-640nm | BLUE 460-485nm | GREEN 560-590nm | RED 600-640nm |
| P [nm] | 280 +/-10 | 340 +/-10 | 360 +/-10 | 340 +/-10 | 400 +/-10 | 450 +/-10 |
| d [nm] | 100 +/-10 | 140 +/-10 | 150 +/-10 | 220 +/-10 | 260 +/-10 | 280 +/-10 |
| Fill factor | 0.4 +/-0.05 | 0.4 +/-0.08 | 0.4 +/-0.1 | 0.56 +/-0.05 | 0.54 +/-0.08 | 0.56 +/-0.08 |
| L [nm] ZNS Coating | 140 +/-10 | 140 +/-10 | 180 +/-15 | 240 +/-10 | 280 +/-10 | 300 +/-10 |
| Illumination Angle | -10° | -8° | -10° | -14° | -14° | -14° |
| Averaged efficiency | >60% | >60% | >60% | >80% | >80% | >80% |

FIG.29

METHOD TO OPTIMIZE A LIGHT COUPLING WAVEGUIDE

TECHNICAL FIELD

The present invention concerns a method to devise a multimodal waveguide comprising a periodic diffractive grating. The method aims to optimize the coupling efficiency of an incident light beam coupled into such a waveguide. The invention also concerns the device obtained by the disclosed method.

STATE OF THE ART

Most of the existing solutions for guiding light have been focused so far on single mode waveguides. Indeed, such a waveguide makes the light transmission easier as only the mode of order zero is transmitted into the waveguide in a straight path. The coupling efficiency corresponds to the efficiency of optical power transfer between two optical components. For example, the transfer may take place between an active component, such as a Light Emitting Diode (LED), and a passive component, such as an optical fiber, or between two passive components such as two optical fibers. Coupling efficiency is usually expressed as the ratio, converted to percent, of the input power, i.e., the available power from one component, to the power transferred to the other component. In order to save power, and increase battery life of portable devices, the coupling efficiency is the key factor that must be kept as high as possible. It is generally assumed that grating coupling to multimode waveguides has an inherently poor efficiency as remarked by Destouches et. al. "Efficient and tolerant resonant grating coupler for multimode optical interconnections" in Optics Express vol. 15, nr. 25, pp 16870-16879, 2007. Even in publications which achieve high coupling efficiency for reflective gratings, Janyce Franc et. al. state that "It is usually believed that grating coupling to a multimode waveguide has extremely low efficiency. This is the case indeed unless a mirrored grating slab is installed at the multimode waveguide side opposite to the incident beam input side." in "High efficiency diffraction grating coupler for multimode optical interconnect" by Janyce Franc et. al. in Micro-Optics, VCSELs, and Photonic Interconnects II: Fabrication, Packaging, and Integration, edited by H. Thienpont, M. R. Taghizadeh, P. Van Daele, J. Mohr, Proc. of SPIE Vol. 6185.

Only a few alternative solutions describing a multimodal waveguide for coupling light have been investigated as the materials that are used are expensive and as their manipulation is complex. Such waveguides comprise a coupling grating in order to input the light into or output the light out of the waveguide. An input beam of light impinging on such an input grating may be coupled into the waveguide such that it propagates within the waveguide and is subsequently coupled out by an output grating providing an output beam of light. Light may be confined in the internal layer of the waveguide by total internal reflection when the dielectric index of the internal layer is larger than that of the surrounding layers.

For example, patent application US2010/0277803 describes a multinodal waveguide comprising an input coupling grating and an output coupling grating. The input and output gratings are diffractive elements, which have a grating period P which is e.g. in the range of w/2 to w where w is a visible wavelength of light. To obtain high transmission efficiency, the input grating must be a slanted grating, which contains surfaces whose slope is steeper than vertical— assuming the grating average surface is horizontal. This results in a structure that is difficult and expensive to mass-produce; standard surface embossing cannot produce it. In addition, the device is adapted to couple light from a small display, which emits polarized light.

Recent developments have shown that the enhancement of the diffraction efficiency of gratings can be obtained by combining gratings with a thin waveguide, having a width of typically one to two wavelengths of the incoupled light. The enhancement of the diffraction efficiency with these techniques is obtained by creating resonance effects for a leaky mode in the waveguide, which is achieved by using destructive interference effects between the incoupled light by the grating in the waveguide and an outcoupled part of the reflected beam guided inside that waveguide. The principle of this diffraction efficiency enhancement by using these resonance effects is discussed in detail in the documents U.S. Pat. No. 6,219,478 and WO2005103771. By the fundamental nature of the interference effects of the incoupled and partially outcoupled light the thickness of the waveguide used to enhance the diffraction effect is very small, and has to be smaller than the temporal coherence which is typically 1 µm for sunlight and 1.5 µm for a typical white light bulb. The devices disclosed in these documents are not suitable for applications requiring bulk waveguides with thicknesses typically thicker than 10 µm, such as are needed in the case of image transmission where thicknesses of a fraction of a mm are required. Waveguide thicknesses of more than typically 1 µm would need very specific light sources such as lasers having high temporal coherence. Also, the devices described in U.S. Pat. No. 6,219,478 and WO2005103771 are substantially gratings covering completely the thin waveguides, and in consequence do not allow coupling and decoupling of an image or of a light spot larger than a few microns, because the first reflection of the incoupled light in the waveguide will be directed onto the incoupling grating.

Similar developments to enhance the efficiency of incoupled light in a multimode waveguide have been made in the field of high density photonic integrated circuits such as reported by L. Zhu et al. in the publication "Novel High Efficiency Vertical to In-plane Optical Coupler", Proc. of SPIE, Vol. 8270, 82700L-1, 2012. Here again, these developments have shown that the waveguide thicknesses to obtain high efficiency coupling of light by a grating are limited to typically 1 µm.

An attempt to realize a device to incouple and outcouple an image or light spot larger than a few microns, without using a resonance effect by the waveguide is described in the document US2005/0002611, which describes a multimodal waveguide comprising an input coupling grating with a sinusoidal shape. The input grating can couple polarized light with an efficiency below 40%, and requires the use of a polarization rotator to ensure that the light gets coupled into the waveguide, and does not exit at the first reflection.

SUMMARY OF THE INVENTION

It is therefore an object of the present invention to couple light into a multimode waveguide, e.g. a bulk transparent material, with a very high efficiency, while imposing some constraints on the waveguide shape to be compatible with mass production manufacturing techniques. The applicant has identified that efficient coupling of the incident beam into the multimode waveguide is achieved if the wavefront of the coupled light in the waveguide is able to propagate along a specific diffraction order, different than the zero order. In the present invention the multimode waveguide consists of a transparent optical foil or sheet, such as a glass plate, a polymer foil or the like, which at one side or both sides of the surface has an optical coupling structure which couples an incident light beam into the waveguide. The coupling structure is periodic and therefore produces diffraction of the incident light beam. Efficient coupling into the waveguide is achieved if only the first and/or the minus first diffraction order is coupled into the waveguide. Alternatively also the second and minus second order diffraction order can be used for efficient coupling. Usually the coupled diffraction order is at least 10 times more intense than any of the other remaining orders in the waveguide. We have shown that under suitable conditions light can be coupled with very high efficiencies of 80% or more into multimode waveguides even if the waveguide is typically thicker than 10 μm, and a thickness of typically a millimeter is possible. To the contrary of what is disclosed in the prior art, the coupling principle of the present invention is not based on a resonance effect. Therefore the grating used to incouple light in the waveguide has a length (D) such that the first reflected light beam inside the waveguide is incident outside the area of the incoupling grating. Therefore, the length (D) of the incoupling grating, measured on one of the top surfaces of the multimode waveguide in the direction of the diffracted beam is related to the thickness (WT) of the waveguide and to the angle β between the waveguide surface normal and the light beam inside said multimode waveguide, by the following inequality:

$$D \leq 2 \cdot WT \cdot \tan \beta$$

This inequality shows that, contrary to the prior art mentioned above, no interference is realized between the incident light coupled into the grating and any partially refracted light beam produced by a light beam inside the waveguide. As no interference is required, the grating thickness can be much larger that the temporal coherence length of the incidence light without lowering the coupling efficiency. The coupling efficiency is of uttermost importance since it is directly linked to the power consumption of the device that integrates the waveguide; a high efficiency reduces the required optical input power and hence the overall power consumption. Because only one diffraction order is able to propagate in the waveguide, the wavefront of the light is very efficiently diffracted and not transmitted without diffraction in the transparent medium. This makes it possible to transport coherent laser beams in the waveguide and/or to transmit entire images or light spots larger than a few microns, efficiently. It also makes it possible to collect light from different parts of the waveguide and concentrate it at one or several regions of the waveguide. Alternatively the light can also be distributed in a predetermined manner by the waveguide.

To this aim, this invention describes a method to obtain the physical characteristics of a grating to be applied on a multimode waveguide. The relationship between the structural parameters and the optical response, i.e. the coupling efficiency into the waveguide, has no mathematical closed form. The relationship is well known in the field of optics and telecommunication, and can be computed using commercial optical software packages, for example, GSolver from Grating Solver Development company. The background equations used by those packages can be found in the scientific publication by M. G. Moharam and T. K. Gaylord "Diffraction analysis of dielectric surface-relief gratings", Journal of optical society of America, Vol 72, No 10, October 1982, pp. 1292-1385. The computation of the optical response can be considered as a black box for the scope of this invention. Every structural parameter of the input grating has an influence on the light transmission into the waveguide. To transmit an image into the waveguide, one diffraction order has to dominate compared to the other diffraction orders. For example, the diffraction order 1 can be optimized such that its power exceeds by a factor greater than 10 the other (positive) diffractive orders. If more than one order is transmitted, the wave front gets altered, and the transmitted images looses in quality. The diffractive orders with different signs, for instance order +1 and −1 do not interfere, since they get coupled in the waveguide into opposite directions.

Thus, the invention concerns a method for constructing a light coupling system according to claim 1 and the device obtainable by such a method.

BRIEF DESCRIPTION OF THE DRAWINGS

FIG. 29 is a table summarizing a medium level optimization and a high level optimization;

DETAILED DESCRIPTION OF SEVERAL EMBODIMENTS ACCORDING TO THE INVENTION

Figure 1:
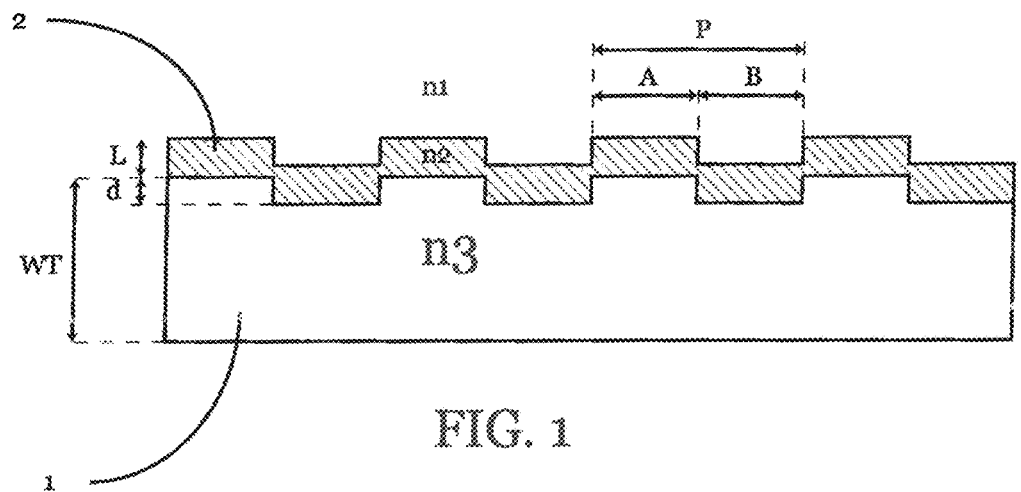
FIG. 1 is a transversal partial view of a waveguide according to an embodiment of the present invention.

Unless specified otherwise, every example disclosed in this document is using a waveguide in an ambient environment composed of air, i.e. with a refractive index n1=1. Also, unless specified otherwise, the incident light beam that hits the waveguide is polarized, with its polarization parallel to the structures of the grating, in other words, a TE polarized light.

The invention concerns a method for constructing a light coupling system wherein a grating comprising a repetition of patterns is manufactured on the surface of a multimode waveguide. Engraving, or hot embossing, or injection molding, or any other suitable method can be used to manufacture the grating. This method comprises a step of choosing a first set of parameters comprising:

wavelength distribution of the incident light to be transmitted by the waveguide,
polarized or unpolarized nature of said incident light,
incident angle standard deviation (Sθ) of the incident light with respect to the waveguide,
shape of the pattern, which is designed to have its local surface normal (Ns) making an angle (α) with respect to the average normal (N) of the surface of the multimode waveguide, said angle (α) being comprised between α=−90° and α=90° in any location of the shape surface,
refractive index (n1) of the medium surrounding the waveguide
waveguide refractive index (n3), said method comprises a step of choosing of a second set of parameters comprising:

grating period (P), separating two adjacent patterns,
grating depth (d) between the highest and the lowest point of the pattern,
incident angle mean value (θ) of the inside light with respect to the waveguide.

In addition, the method comprises a step of optimization of the second set of parameters, to obtain a transmission efficiency (Ce) of the incident light into said waveguide for the positive first or the positive second diffractive order or the negative first or negative second diffractive order exceeding 35% at a given wavelength of the incident light for unpolarized incident light. For polarized incident light, said transmission efficiency (Ce) exceeds 50% at a given wavelength. The method comprises a step of manufacturing the grating on the surface of the multimode waveguide according to said optimized second set of parameters.

The coupling efficiency compares the input light power to the light power that managed to cross the grating. If we consider the whole system, namely the multimode waveguide and the grating, it can be convenient to optimize the system such as to inject the maximum amount of light into the section of the multimode waveguide (11) that exhibits repeated total internal reflections. To perform said optimization of the overall coupling efficiency, the length (D) of the grating measured on the waveguide surface along a direction defined by the light path is related to the waveguide thickness (WT) and to the angle β between the waveguide surface normal and the coupled light beam inside the waveguide by the following inequality:

$$D \leq 2 \cdot WT \cdot \tan \beta$$

This inequality is fundamental to the present invention as it shows that, to the contrary of resonating waveguides taught in the prior art, no interference is realized between the incident light coupled into the grating and any outcoupled refracted light beam produced by a light beam inside the waveguide. In other words, the length (D) of the grating measured on the waveguide surface along a direction defined by said incident light is smaller than the distance (5) between the spot where the incident light is coupled into the grating, and the spot where the beam of light hits the waveguide top surface after the first internal reflection in the waveguide, provided the waveguide top surface is the surface on which the grating is manufactured. Advantageously, the waveguide thickness (WT) is larger or equal to 1 micron, and can be preferably larger or equal to 0.5 mm, which is essentially impossible to achieve in devices using resonance effects, i.e. Interference effects between partially reflected, coherent, light beams as explained in detail in for example U.S. Pat. No. 6,219,478 and WO 2005103771 with common light sources having temporal coherence of a few microns.

The optimization of the waveguide geometry and especially the waveguide thickness is performed after the optimization according to claim 1, i.e. after the optimization of the second set of parameters mentioned above. Indeed the thickness of the waveguide is independent from the optimization of the coupling structure efficiency, according to claim 1 which is not possible when resonance conditions and coherence requirements have to be considered, as for example in U.S. Pat. No. 6,219,478 and WO 2005103771.

The shape of the pattern can be rectangular; the optimization step then comprises the optimization of the rectangular fill factor (A/P) defined as the width of a rectangle compared to the grating period (P), as shown in FIG. 1.

The shape of the pattern can also be a blazed shape, a sinusoidal shape, a triangular shape, a staircase shape or any other repetitive shape according to claim 1. The staircase shape achieves coupling light with a wider spectrum than the other shapes.

In order to get a better coupling efficiency,
the grating is covered by an enhancement layer (2) whose refractive index n2 belongs to the first set of parameters, and whose thickness (L) belongs to the second set of parameters, and
wherein the optimization step comprises the optimization of said layer thickness (L), and
wherein n2-n1 is greater or equal to 0.3, preferably greater or equal to 0.5 preferably greater or equal to 0.8, and
wherein n2-n3 is greater or equal to 0.3, preferably greater or equal to 0.5 preferably greater or equal to 0.8.

In order to protect the waveguide from environmental factors, such as touch, humidity, chemistry and the like, the entire waveguide or parts of the waveguide including or not the coupling structure, can be covered by a material with lower index of refraction that the waveguide. The refractive index of the cover material should be at least 0.07 smaller, preferably, at smaller or equal by 0.15 than the refractive index of the multimode or bulk waveguide.

The optimization step can be designed to obtain a transmission efficiency of the incident light into said waveguide for the first or the second diffractive order exceeding 50% preferably exceeding 70% preferably exceeding 90% at a given wavelength of the incident light. As shown later, to get a coupling efficiency of nearly 100%, the incident angle mean value ($\theta$) must be small but not zero. Its absolute value tends to be comprised between 2 and 12 degrees.

In practice, to obtain a desired coupling efficiency, the optimization step starts by
defining a target efficiency given as an input distribution with respect to the wavelength of the incident light,
followed by a computation step that computes the efficiency with respect to the wavelength of the incident light on the basis of the first and second sets of parameters,
followed by a minimization step that minimizes the difference between the target efficiency and the computed efficiency by modifying each parameter of the second set of parameters.

The target efficiency being a function of the wavelength (w) can conveniently be represented by a vector of values. The difference between the target efficiency and the computed efficiency can be any usual error function, for example the squared error function, also known as L2 norm, or the absolute difference, also known as L1 norm, or any other function, as long as it reaches its minimum when the computed efficiency is equal to the target efficiency. To take into account the standard deviation of the incident angle, the computation step computes the efficiency based on several incident angles according to the incident angle distribution defined by the incident angle mean and the incident angle standard deviation, and averages the result accordingly in order to get an efficiency as a function of wavelength.

The computation step and the minimization step are iterated in alternation several times until the difference between the target efficiency and the computed efficiency does not vary significantly. For example, the iterations can be stopped when the difference does not vary by more than 0.1% between two consecutive iteration steps.

The optimization method described so far comprises a lot of parameters. In order to accelerate the convergence of the optimization step, and to make sure that the result is compatible with the production at a reasonable price, the parameters of the second set can be advantageously constrained during the minimization step.

The grating depth (d) between the highest and the lowest point of the pattern can be constrained between 10 nm and 1000 nm, preferably between 20 nm and 400 nm.

The waveguide thickness (WT) can be constrained to be larger or equal to 1 micron, preferably larger or equal to 0.5 mm.

For rectangular shaped gratings, the rectangular fill factor can be constrained between 10% and 90%, preferably between 40% and 60.

When an enhancement layer is present, the thickness (L) of the enhancement layer (2) can be constrained between 10 nm and 500 nm, preferably between 100 nm and 200 nm.

For visible light with wavelength ranging from 400 nm to 700 nm, the grating period (P), separating two adjacent patterns, can be can be constrained between 230 nm and 840 nm.

For infrared light with wavelength ranging from 700 nm to 2500 nm, the grating period (P), separating two adjacent patterns, can be constrained between 580 nm and 3000 nm.

For ultraviolet light with wavelength ranging from 250 nm to 400 nm, the grating period (P), separating two adjacent patterns, can be constrained between 180 nm and 560 nm.

An optimization method that converges quickly to a solution is the particle swarm optimization, commonly found for any optimization software. The method starts by choosing randomly one set of values, or several set of values, within the constrained boundaries for each parameter. The parameters are, of course, the ones belonging to the second set of parameters according to the present invention, since these are the only ones that get optimized by the optimization method.

The invention also concerns a light coupling system comprising a multimode waveguide with an input grating manufactured on the top surface of said multimode waveguide, which defines the entrance of the waveguide for the incident light beam, said grating comprising a repetition of patterns, that have its local surface normal (Ns) making an angle ($\alpha$) with respect to the average normal (N) of the surface of the multimode waveguide, said angle ($\alpha$) being comprised between $\alpha=-90°$ and $\alpha=90°$ in any location of the shape surface, said light coupling system being defined by a set of parameters comprising:
grating period (P), separating two adjacent patterns,
grating depth (d) between the highest and the lowest point of the pattern,
waveguide refractive index (n3),
wherein said set of parameters is optimized to obtain a transmission efficiency (Ce) of the incident light beam into said waveguide for the first or the second diffractive order that exceeds 35% for unpolarized light at a given wavelength of the incident light beam, or that exceeds 50% for polarized light at a given wavelength of the incident light beam. The optimization method according to the present invention defines, once it has converged, the relationship between the structural parameters of the light coupling system that reaches said transmission efficiency (Ce); in particular the value of the grating period (P), separating two adjacent patterns, and the value of the grating depth (d) between the highest and the lowest point of the pattern. The waveguide refractive index (n3) is chosen beforehand, by choosing the material used to manufacture the waveguide. The grating shape is also chosen beforehand. Unfortunately, there is no closed form relationship that relate the structural parameters of the light coupling system to ensure a given coupling to efficiency, thus the only way to characterize the light coupling system is by measuring its coupling efficiency.

Advantageously, the shape of the grating pattern may be rectangular with a fill factor (A/P), defined as the width of a rectangle (A) compared to the grating period (P), comprised between 10% and 90%, preferably between 40% and 60%. The fill factor is optimized together with the set of parameters. In this case, the optimization method according to the present invention defines, once it has converged, the value of the grating period (P) separating two adjacent patterns, the value of the fill factor of the rectangular grating (A/P), and the value of the grating depth (d) of the rectangles.

In particular, the invention also concerns a light coupling system comprising a multimodal waveguide and a periodic diffractive grating for coupling a wavefront of a beam of light into said waveguide, said periodic diffractive grating may be coated with a refractive enhancement layer (2). The refractive enhancement layer (2) has a refraction index n2, wherein n2-n1 is greater or equal to 0.3, preferably greater or equal to 0.5 preferably greater or equal to 0.8, and wherein n2-n3 is greater or equal to 0.3, preferably greater or equal to 0.5 preferably greater or equal to 0.8. The enhancement layer (2) thickness (L) is optimized as an additional parameter in the parameter set characterizing the light coupling system in order to obtain a transmission efficiency for the first or the second diffractive order exceeding 50% preferably exceeding 70% preferably exceeding 90% at a given wavelength of the incident light beam.

Such a grating allows high coupling efficiency, up to nearly 100%, depending on the nature and thickness of the refractive enhancement layer and by tuning e.g. the grating period, the grating depth, the refraction indexes of the waveguide, the grating and the refractive enhancement layer, the incidence angle of the input beam of light, the input light wavelength and the size of the input grating. In particular, such a waveguide, through its efficiency and by tuning the parameters, allows controlling intensity and colors when transmitting images.

The multimode waveguide may be made of a transparent material like glass, quartz or a polymer, preferably a transparent polymer like e.g. polycarbonate which is transparent, Polymethyl Methacrylate (PMMA), which is cheap and melts quickly, or PET, or solgel, etc. A polymer material is advantageously flexible.

Advantageously, the refractive enhancement layer is made of a high refraction index material. Such a material may be zinc sulfide (ZnS) or hafnium oxide (HfO$_2$) or titanium dioxide (TiO$_2$) or tantalum pentoxide (Ta$_2$O$_5$) or Zirconium dioxide (ZrO$_2$), or AlN, or Al$_2$O$_3$ or ZnO or any combination of these materials. Such materials are easy to use. For example, the coating may be performed directly on the grating with methods well known to the skilled person in the art.

Advantageously, the grating depth (d) between the highest and the lowest point of the pattern is comprised between 10 nm and 1000 nm, preferably between 20 nm and 400 nm.

Advantageously, the thickness (L) of the enhancement layer (2) is comprised between 10 nm and 500 nm, preferably between 100 nm and 200 nm.

Advantageously, for coupling light with a wavelength comprised between 400 nm and 700 nm, the grating period (P), separating two adjacent patterns, is comprised between 230 nm and 840 nm.

Advantageously, for coupling light with a wavelength comprised between 700 nm and 2500 nm, the grating period (P), separating two adjacent patterns, is comprised between 580 nm and 3000 nm.

Advantageously, for coupling light with a wavelength comprised between 250 nm and 400 nm, the grating period (P), separating two adjacent patterns, is comprised between 180 nm and 560 nm. Advantageously, the refractive enhancement layer of refraction index 112 is located between the periodic diffractive grating of refraction index 113 and a medium of refraction index n1, such as e.g. air. In the case where the refraction index is a complex number, it is meant here the real value of the refraction index. To compute more precisely the coupling efficiency, the refraction index can be considered as a function of the wavelength, i.e. a real number for each considered wavelength, instead of an average value for each wavelength. This refraction index function is well known for each considered material.

Therefore, the material, and therefore the refraction index of the refractive enhancement layer may be selected in regard to the refraction index of the waveguide in order to optimize the coupling efficiency.

In an embodiment according to the invention, the multimodal waveguide is substantially parallelepiped and comprises a substrate comprising one input periodic diffractive grating for receiving an incoming beam of light and one output periodic diffractive grating for outputting the corresponding beam of light. The refraction index and/or the thickness of the refractive enhancement layer may then be chosen depending on the thickness and/or the refraction index of the waveguide so that the in-coupled light is propagated within the substrate by internal reflections and outputted or coupled out of the waveguide by the output periodic diffractive grating with less than 30% loss of efficiency of coupling. The different refraction indexes n1, n2, n3 may be selected so that the incident angle of the input beam in the substrate derive a path within the waveguide where the beam reaches, after internal reflections within the substrate, the output periodic diffractive grating. In a particular embodiment wherein said output periodic diffractive grating has the same structural characteristics as the input periodic diffractive grating, and if the incoupled light beam is monochromatic and has substantially no angular divergence, the wavefront of the outcoupled light beam will be substantially identical as the wavefront of the incoupled light beam in the waveguide so that an image can be in-coupled in the waveguide, transmitted by internal reflection in said waveguide, and outcoupled by said output periodic diffraction grating without substantial distortion.

The invention also concerns a system comprising a multimodal waveguide as defined here above and a light input component configured for providing a beam of light to the grating of the multimodal waveguide.

Several embodiments of a grating obtained by a method according to this invention are described in relation to the figures that illustrate them, or illustrate their properties.

FIG. 1 is a transversal partial view of a waveguide according to a device obtained by the method according to claims 2 and 3, i.e. by the method described above for a light coupling system with a rectangular pattern and with an enhancement layer. The waveguide 1 is coated with an enhancement layer 2 of thickness L. The grating comprises rectangular repetitive shapes of depth d, of period P and whose fill factor is equal to A/P; A being the width of the protuberant rectangle.

Figure 2:
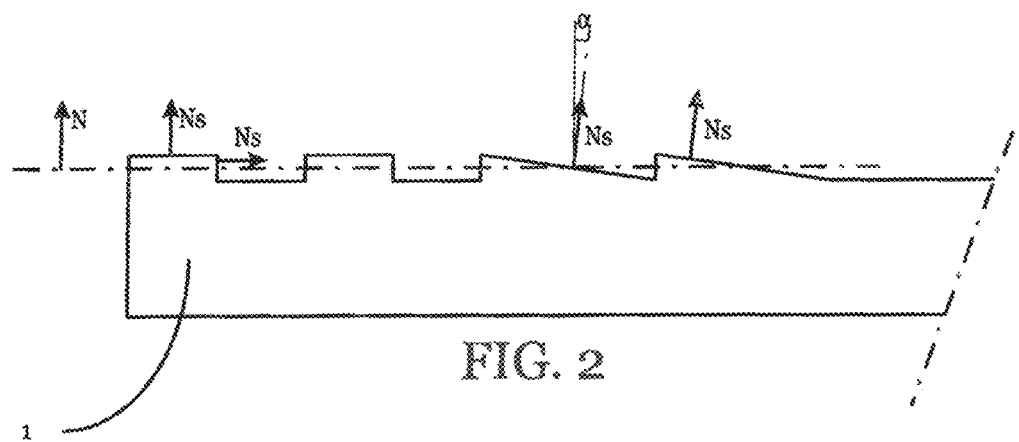
FIG. 2 is a transversal partial view of a waveguide to illustrate the different shapes engraved on the waveguide.
Figure 3:
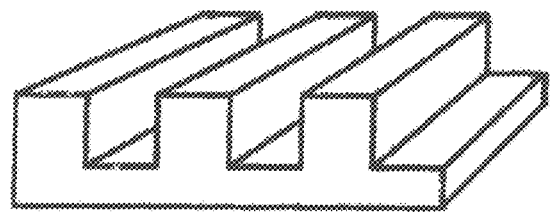
FIG. 3 illustrates a partial perspective view of an embodiment of a waveguide with rectangular shapes according to the present invention.
Figure 4:
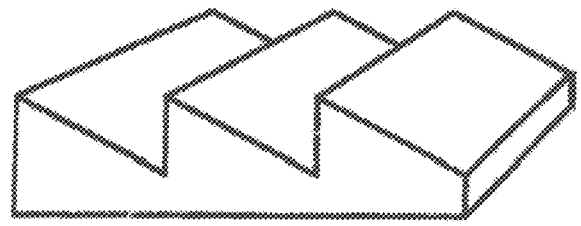
FIG. 4 illustrates a partial perspective view of an embodiment of a waveguide with blazed shapes according to the present invention.
Figure 5:
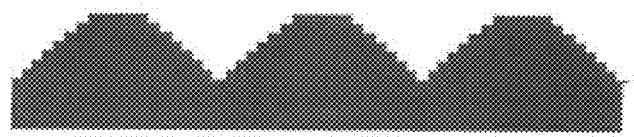
FIG. 5 illustrates a partial perspective view of an embodiment of a waveguide with a staircase shape according to the present invention.

FIG. 2 is a transversal partial view of a waveguide engraved with two different gratings to illustrate the angle α of the local surface Normal (Ns) with respect to the average normal (N) of the surface of the multimode waveguide. The condition on the surface orientation is dictated by production requirements. If the absolute value of angle α does not exceed 90°, the grating can be produced using a standard embossing procedure, allowing for inexpensive mass production of the waveguide according to the present invention. This can lead to a multitude of possible grating shapes; the pattern can be any repetitive shape that fulfills said surface orientation requirement, for example a sinusoidal pattern, a squared pattern, a blazed pattern, a triangular pattern, some of which are shown as examples in FIGS. 3 to 5.

Figure 6:
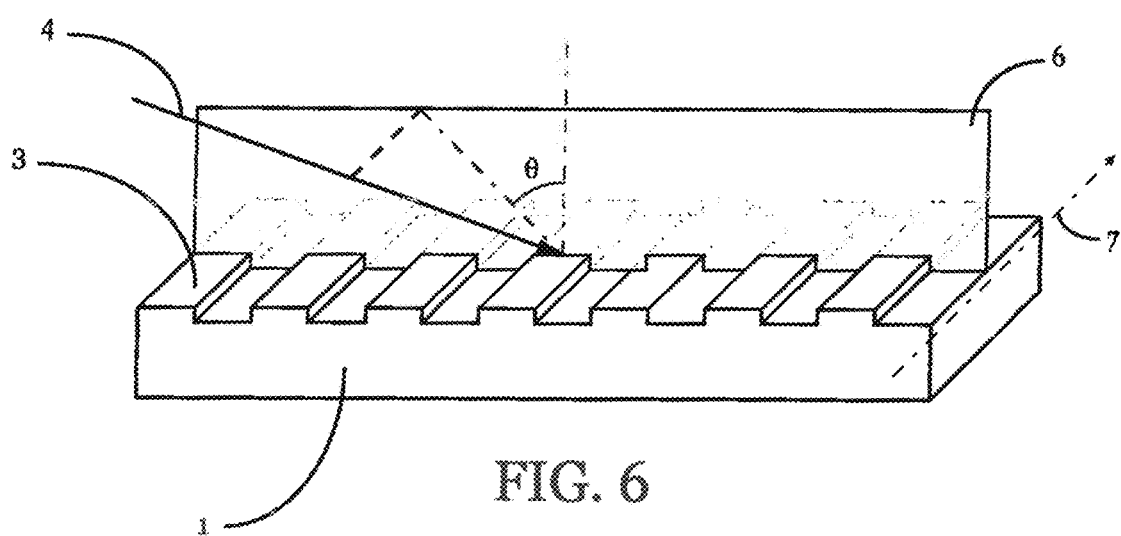
FIG. 6 schematically illustrates incident light incoming on a periodic diffractive grating of a waveguide according to the present invention.

FIG. 6 schematically illustrates incident light 4 incoming on a periodic diffractive grating 3 of a waveguide 1 obtained according to claim 2 of the present invention. The incident angle (θ) of the incident light beam is defined as the angle between the average normal (N) of the surface and the projection of the beam of light on a plane 6, which is perpendicular to the grating orientation 7. The plane 6 is not part of the invention. As shown on FIG. 6, the grating comprises a repetition of shapes, which are repeated along a direction perpendicular to the grating orientation 7.

Figure 7:
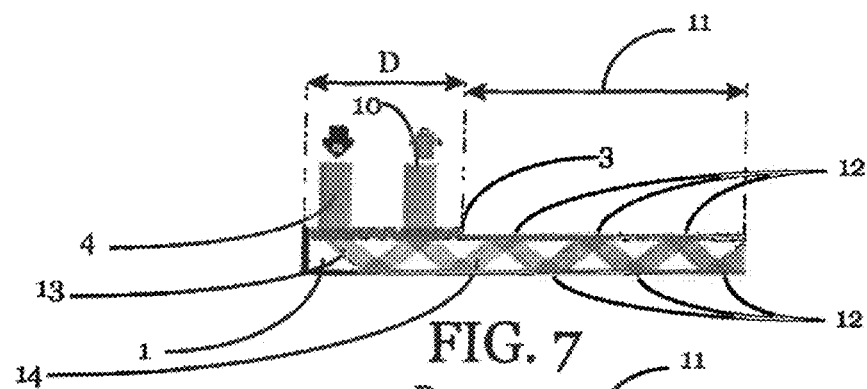
FIGS. 7 to 8 schematically illustrates incident light incoming on a periodic diffractive grating of a waveguide according to the present invention and the influence of the waveguide thickness on the transmission of the light.
Figure 8:
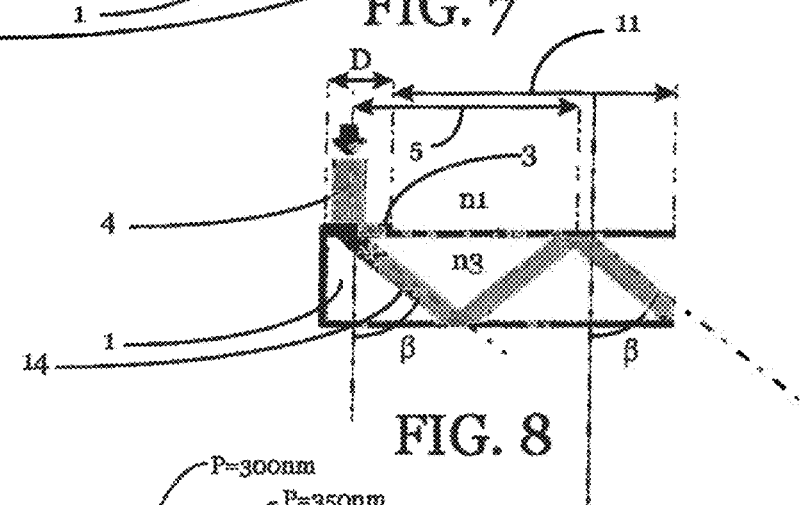

FIGS. 7 and 8 schematically illustrate the incident light 4 incoming on a periodic diffractive grating of a waveguide 1 obtained by claim 1 of the present invention.

Figure 9:
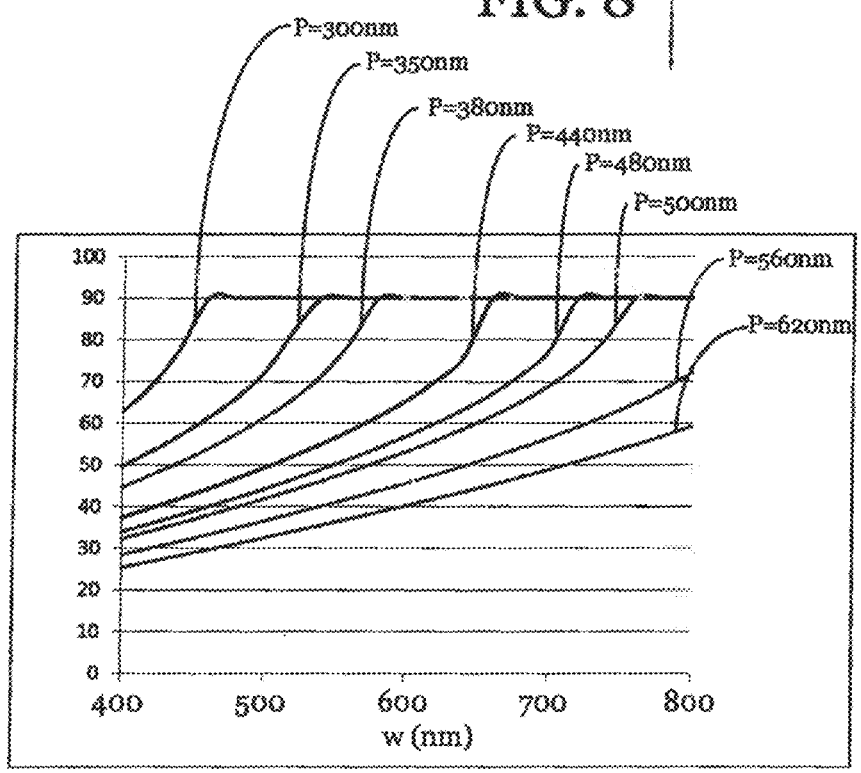
FIG. 9 shows the internal angle of the diffractive order 1 coupled light beam as a function of the wavelength for different grating periods (P)

FIGS. 7 and 8 illustrate the influence of the waveguide thickness (WT) on the transmission of the light. When the waveguide comprises a section (11) designed to transmit the light by total internal reflections (12), and when the purpose of the grating is to couple the light into said section (11), the thickness (WT) is optimized such as to maximize the amount of light that reaches said section (11); the overall coupling efficiency may be defined as the ratio between one given mode, for example +1 or −1, of the coupled light (14) into said section (n) and the incident light (4) at a given wavelength. If the thickness is not optimally set, like in FIG. 7, part of the light (10) gets decoupled from the waveguide before reaching the section of the waveguide (11) which guides the light by internal reflections. This decoupling results in a loss of the overall coupling efficiency. Once the light reaches section 11 of the waveguide, it is guided by a succession of total internal reflections (12), as long as the angle β, between the waveguide surface normal and the coupled light beam inside the waveguide is large enough. This total internal reflection angle limit is well known and depends on the refractive indices n1 and n3. For example, it is equal to 41.8° for n1=1 and n3=1.5, and equal to 38.7° for n1=1 and n3=1.6. FIG. 9 shows the coupling angle β for several grating periods P of a rectangular shaped grating for the first diffraction order. Thus, using this property, it is possible to make further selection of wavelength, by making the waveguide transmit some wavelength by total internal reflections, and leave other wavelengths out. When the waveguide does not comprise a section (11) designed to guide the light by total internal reflections, the coupling efficiency may be defined as the ratio between one given mode, for example +1 or −1, of the coupled light (13), which is the light that managed to cross the grating, and the incident light (4) at a given wavelength.

Figure 10:
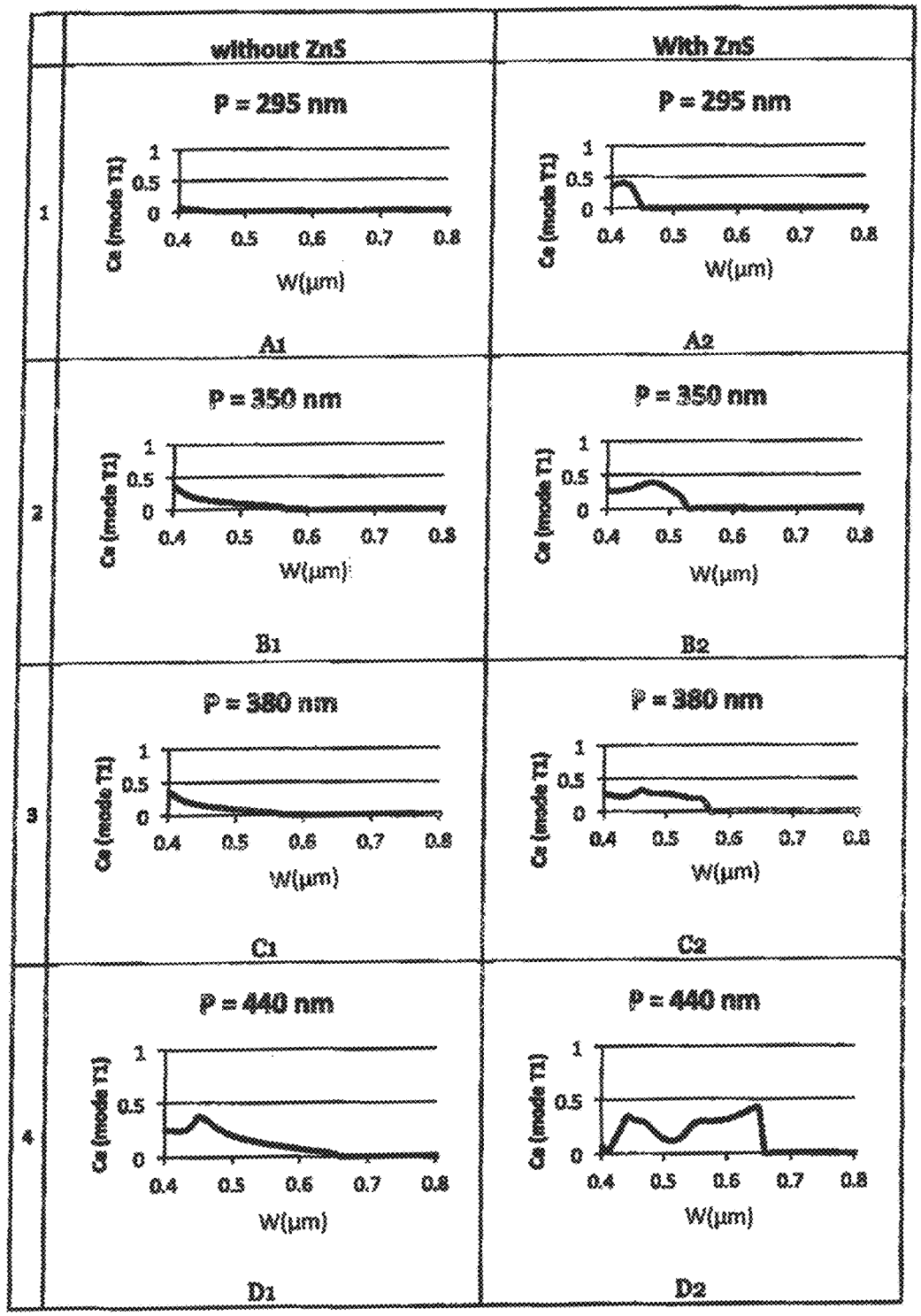
FIG. 10 compares the coupling efficiency (Ce) of normal incident light on a multimode waveguide for different periods (P) of the grating with and without the enhancement layer.

FIG. 10 compares:
in the left column, results of light coupling systems obtained by the method of claim 2, i.e. obtained by the method described above for a system with a rectangular pattern, and without any enhancement, with
in the right column, similar systems obtained by the method of claim 3, i.e. with an enhancement layer.

Figure 24:
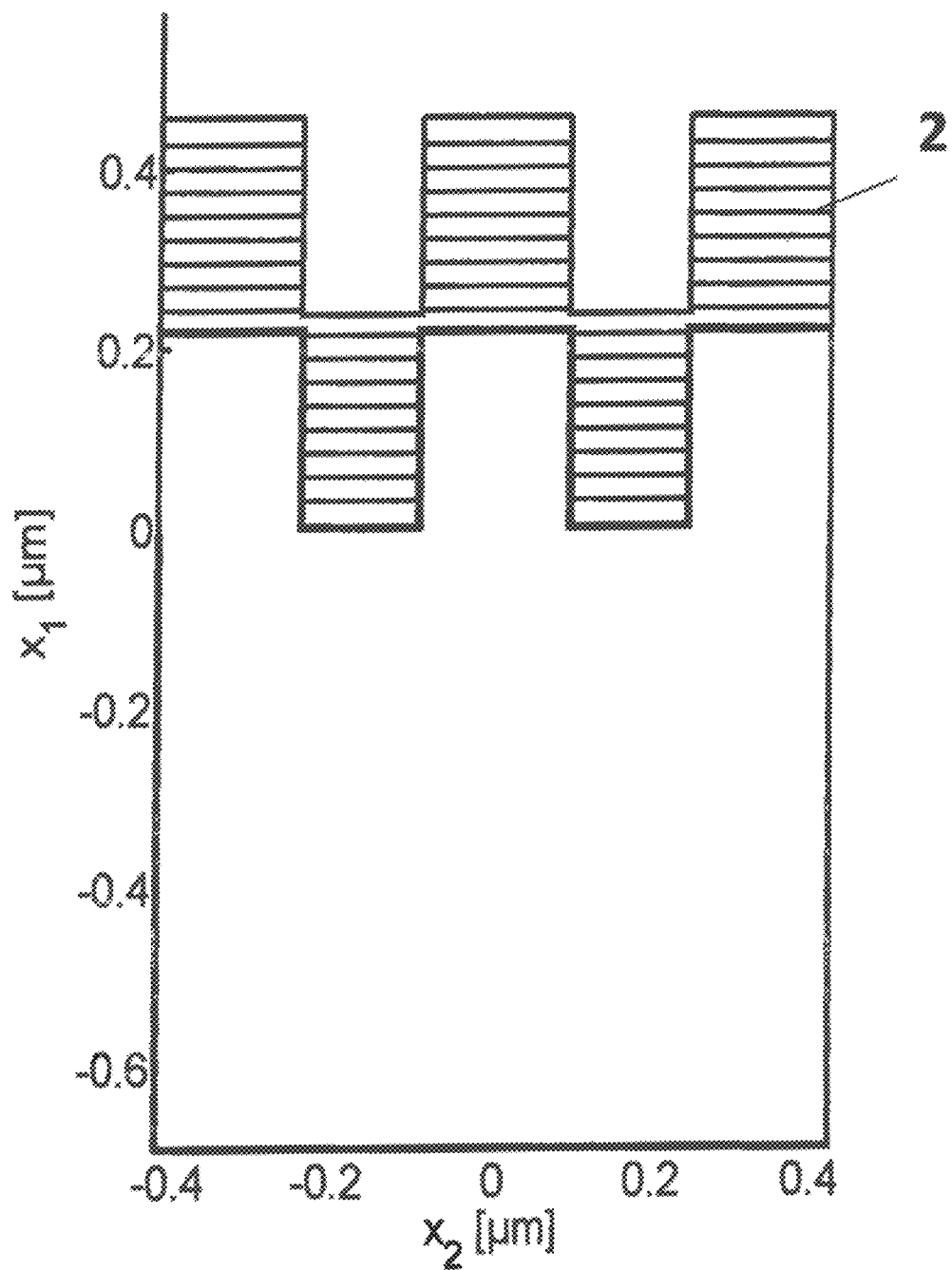
FIG. 24 shows an illustration of a ZnS grating structure realized on the surface of a multimode or bulk waveguide or a transparent layer optimized for unpolarized light.

It illustrates the coupling efficiency (Ce) of normal incident light on a multimode waveguide for different periods (P) of the grating, as a function of the wavelength (w). The grating depth (d) is 200 nm. The refraction index of the waveguide n3 is 1.5. On the first column of the table, the grating is uncoated. On the second column of the table, the grating is coated with an enhancement layer made of ZnS with a thickness L=200 nm. The ZnS coating enhances the coupling efficiency. FIG. 24 illustrates such a ZnS coating deposited on an incoupling grating. Larger periods P shift the coupling efficiency to the red and infrared part of the spectrum.

Figure 11:
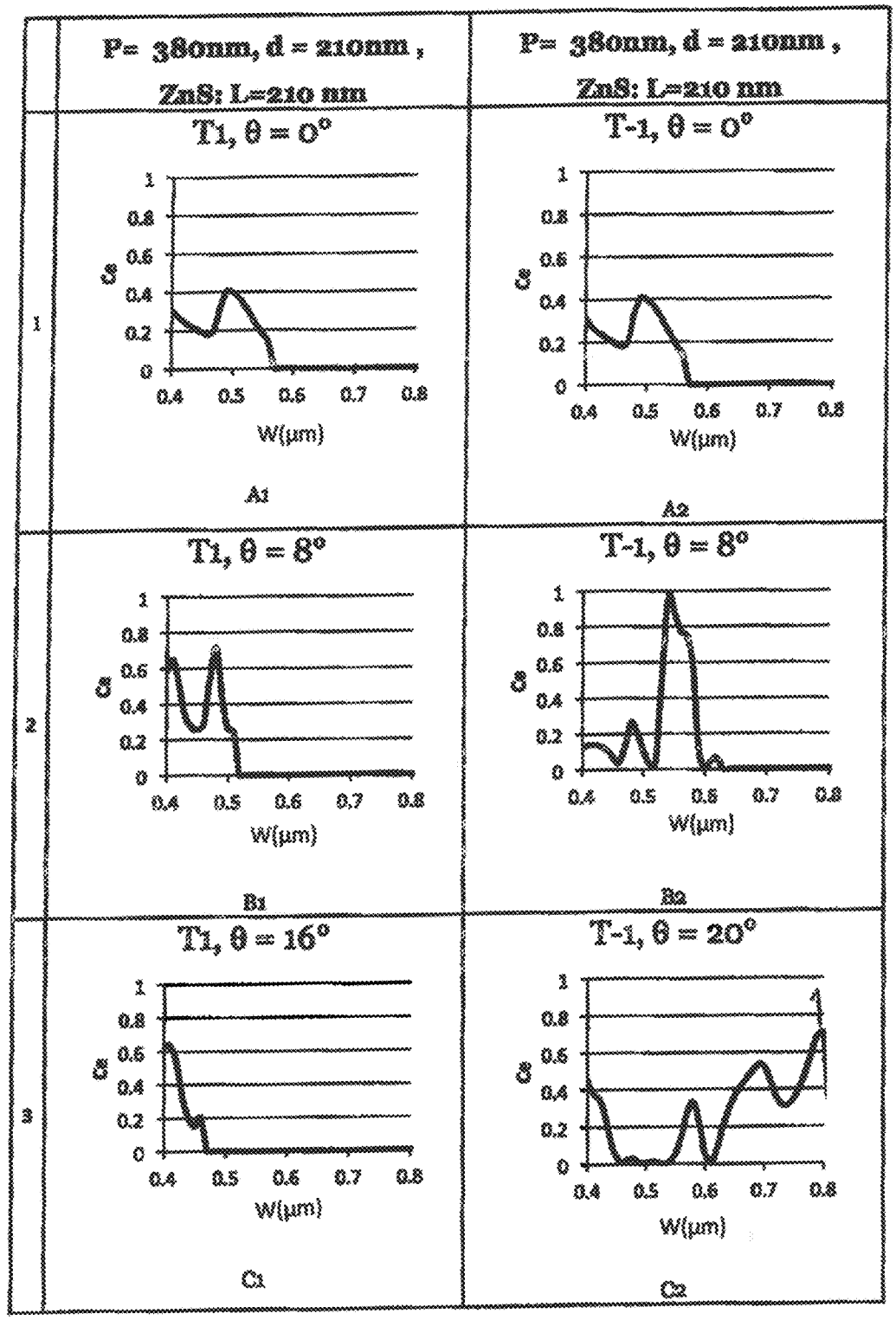
FIG. 11 illustrates the coupling efficiency (Ce) of an incident light impinging on the grating with an angle (θ), for the diffraction order 1 (T1) and diffraction order 1 (T-1), for a waveguide with an enhancement layer.

FIG. 11 illustrates the coupling efficiency (Ce) of an incident light impinging on the grating with an angle θ, for the diffraction order 1 (T1)—In cells A1, B1 and C1—and diffraction order −1 (T-1)—in cells A2, B2 and C2 for a device obtained by a method according to claims 2 and 3. The grating depth d is 210 nm, the grating period (P) is 380 nm. The refraction index of the waveguide n3 is 1.5. The grating is coated with an enhancement layer made of ZnS with a thickness L=210 nm. The figure shows that an efficiency of nearly 100% can be obtained with an incident angle θ=8°, for the diffraction order −1 and a wavelength around 550 nm. The figure also shows the limitation of the coupling efficiency if the incident light is normal to the average grating surface. FIG. 11 also illustrates that the method according to claim 6 can be applied by defining two target efficiency distributions in a setup according to the top of FIG. 14: a target efficiency can be defined for order +1, another target efficiency can, be defined for order −1; the order +1 is coupled toward the right of the waveguide, order −1 is coupled toward the left of the waveguide; the difference between the target efficiency and the computed efficiency being the sum of the differences for each mode taken separately, Said setup can be used to split the light according to its wavelength.

Figure 12:
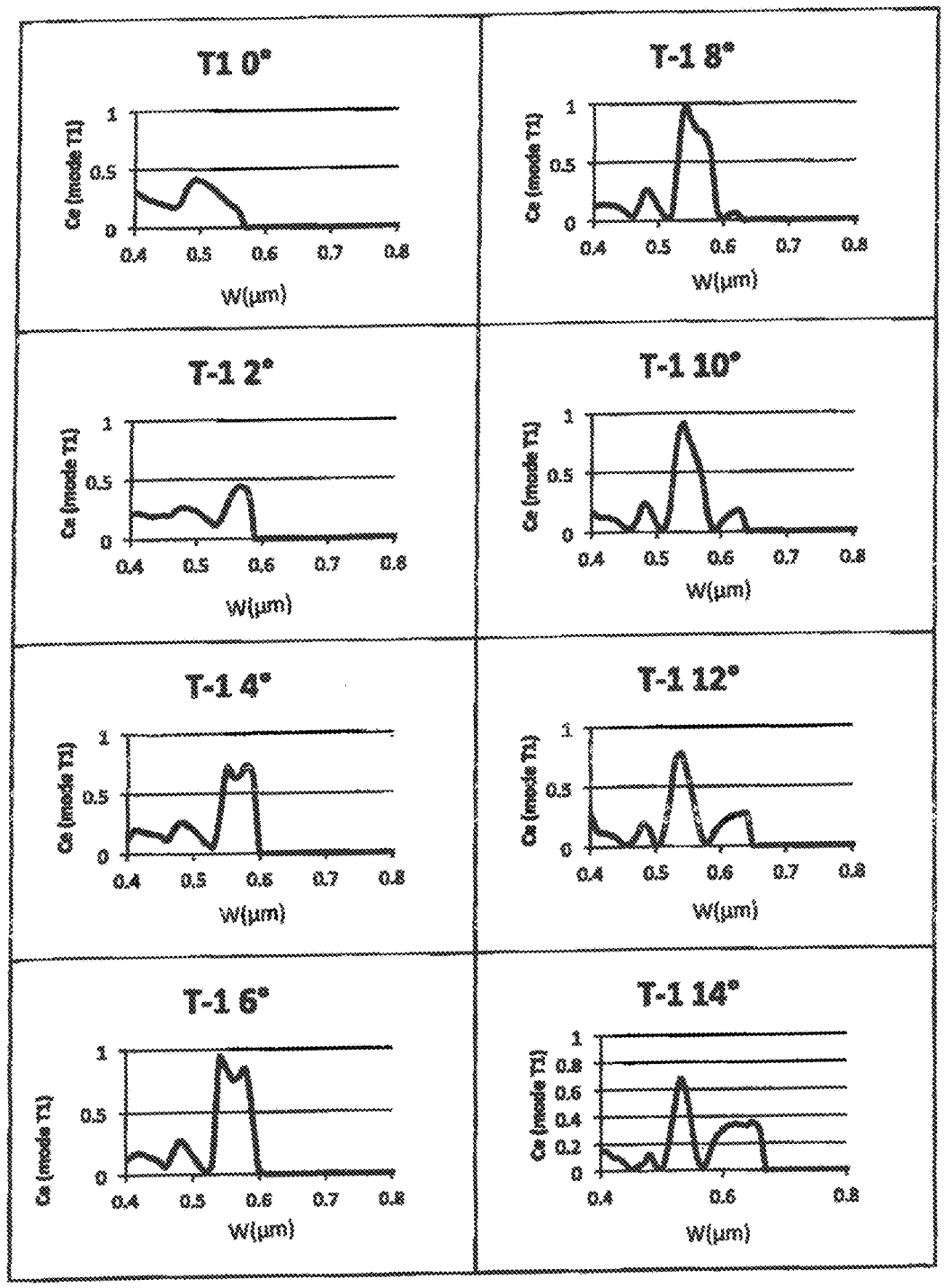
FIG. 12 shows the coupling efficiency (Ce) for different incident angles (θ) for a waveguide with an enhancement layer.
Figure 13:
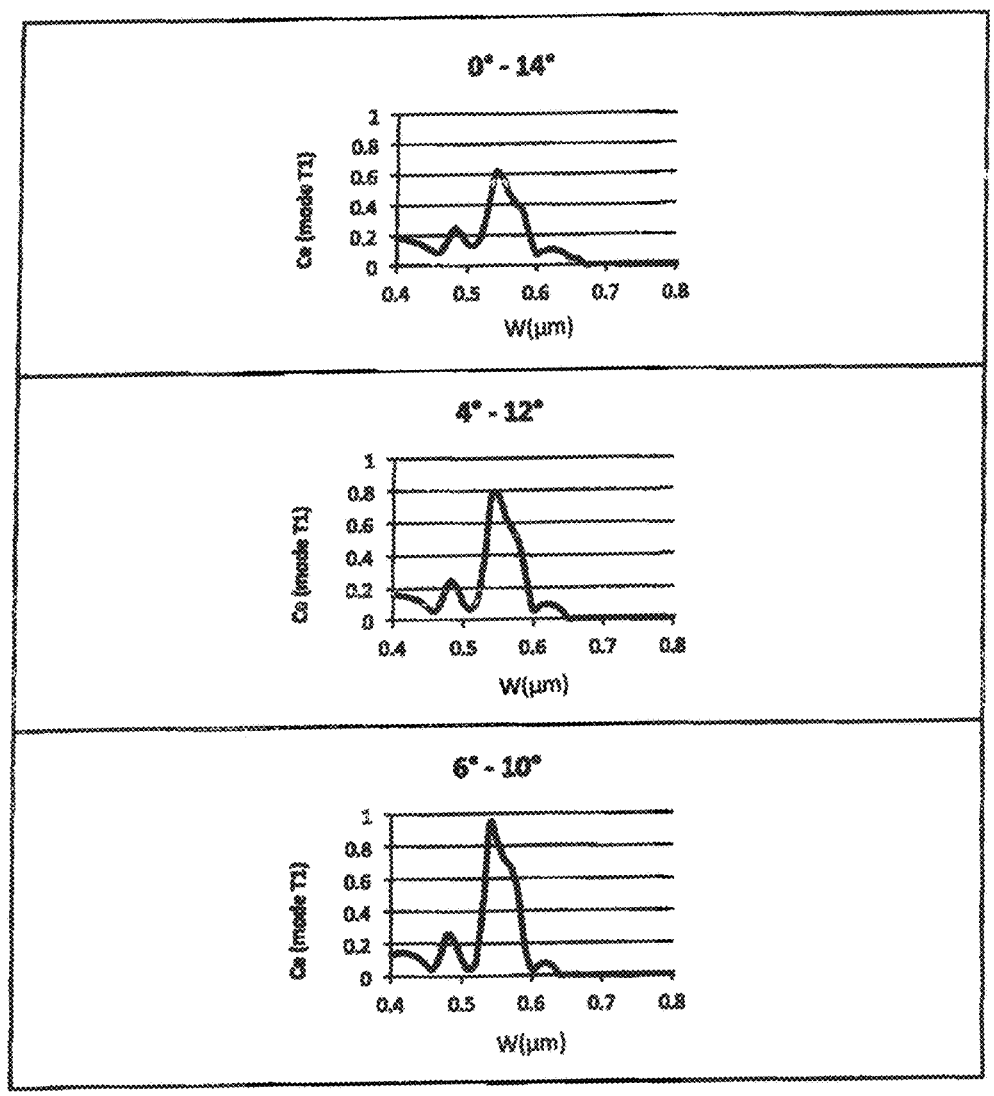
FIG. 13 combines the results of FIG. 12, and shows the influence of the incident light angle variance on the transmission efficiency.

FIG. 12 shows the coupling efficiency (Ce) for different incident angles θ or a device obtained by the method according to claim 4. The grating depth d is 210 nm, the grating period P is 380 nm. The refraction index of the waveguide n3 is 1.5. The grating is coated with an enhancement layer made of ZnS with a thickness L=210 nm. FIG. 13 combines the results of FIG. 12, using the same waveguide and grating to show the coupling efficiency of a non-collimated incident light beam. The Figure shows, for example, that the coupling efficiency can reach 80% even if the incident angle (θ) of the input light beam varies from 4° to 12°, and can reach 90% if said angle is comprised between 6° and 10°. It shows that the incident angle standard deviation (Sθ) has an influence on the coupling efficiency, and helps setting the incident angle standard deviation in the method of claim 1. A collimated light beam has a small standard deviation (Sθ), as found in lasers with a beam divergence Sθ of 1 to 2 mrad, whereas a non-collimated beam has a large standard deviation (Sθ).

Figure 14:
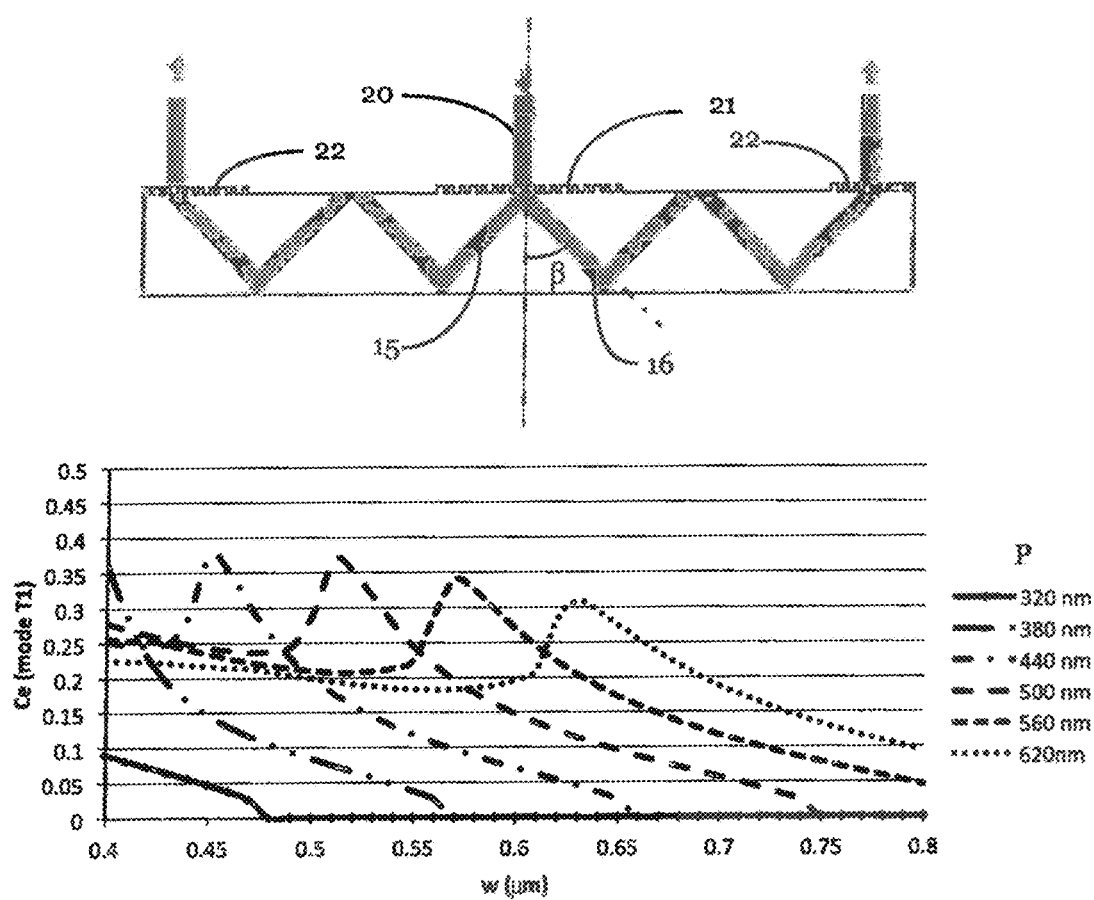
FIG. 14 show the influence of the grating period (P) on the coupling efficiency as a function of wavelength (w) for a normal incident light.

FIG. 14 show the influence of the grating period (P) on the coupling efficiency as a function of wavelength (w) for a normal incident light beam on a device obtained according to the method of claim 2. The figure shows the diffraction order 1 (16) and the diffraction order −1 (15), which for a normal incident beam have the same coupling performance. It shows a setup where a wavefront 20 is coupled into the waveguide according to the invention through a first grating 21 and decoupled through two gratings 22. It shows that the grating can be used as a spectral filter.

Figure 15:
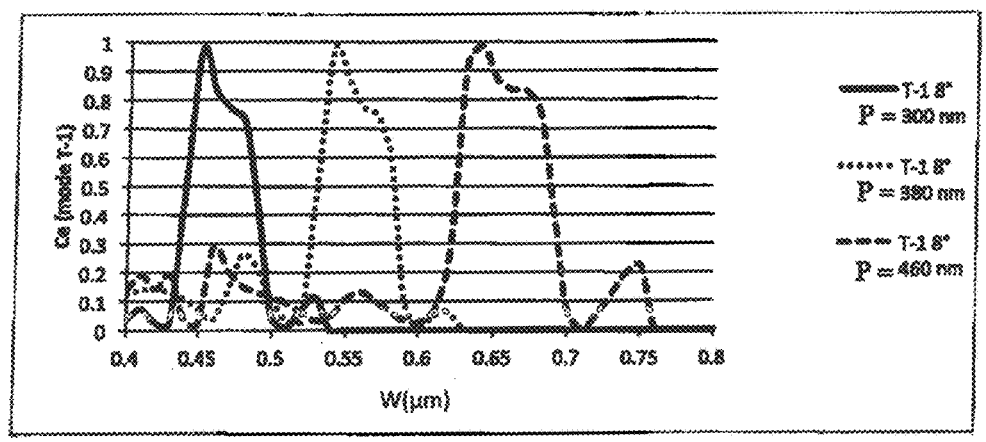
FIG. 15 show the influence of the grating period P on the coupling efficiency as a function of the wavelength (w)
Figure 16:
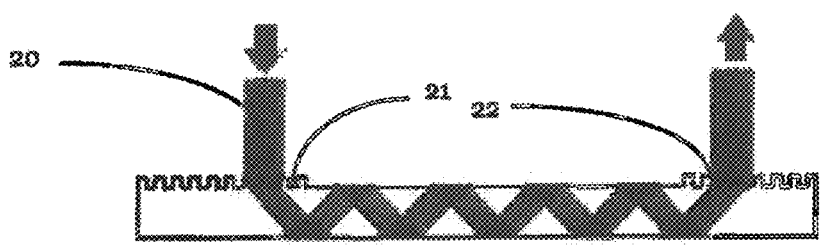
FIG. 16 shows an application of a waveguide to transmit an image from an input location to an output location.
Figure 17:
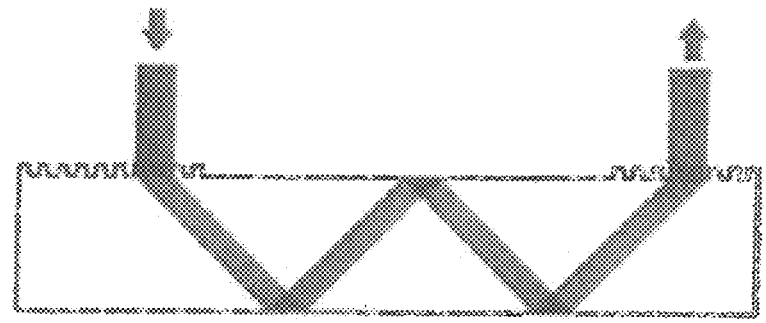
FIG. 17 shows an application of a waveguide to transmit a laser beam coherently from an input location to an output location. After exiting the waveguide at the output location the laser beam is still collimated and shows speckle.
Figure 18:
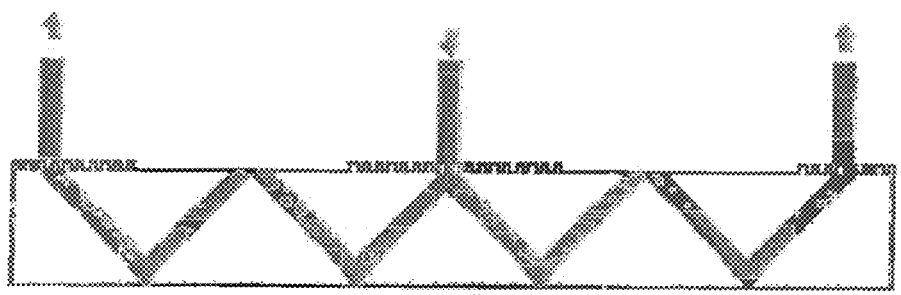
FIG. 18 shows a light concentrator with a waveguide. Light is coupled into the waveguide from several sides and concentrates in the center of the drawing.

FIG. 15 show the influence of the grating period (P) on the coupling efficiency as a function of wavelength (w) for an incident light beam at 8° for a device obtained by the method according to claims 2 and 3, i.e. the method described above for a light coupling system with a rectangular pattern and with an enhancement layer. The depth (d) of the grating is 200 nm. The refraction index n3 of the grating is 1.5. The angle of the incident light with the surface normal vector ($\theta$) is 8°. Longer periods (P) shift the coupling efficiency to the red and infrared part of the spectrum. FIG. 16 shows a setup where a wavefront 20 is coupled into the waveguide according to the invention through a first grating 21 and decoupled through a second grating 22. This setup can be used to transmit an image of an object located in front of grating 21 to a remote sensor located in front of grating 22 and sensibly reduces the required free space that would be necessary in a conventional imaging situation.

Optimization and Method

Figure 19:
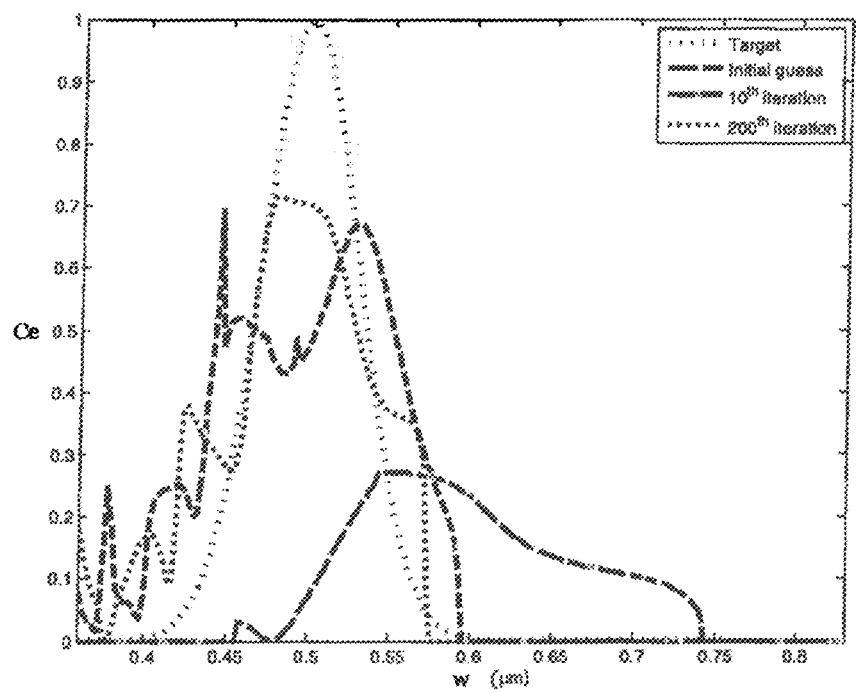
FIG. 19 shows the coupling efficiency (Ce) of a grating and waveguide during the optimization of the second set of parameters of the grating.
Figure 20:
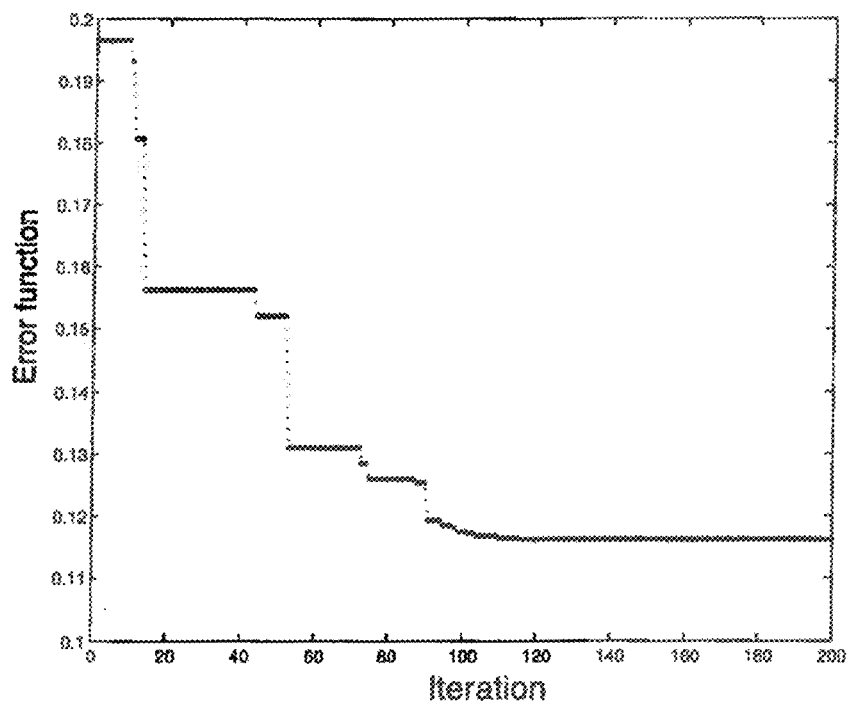
FIG. 20 shows the evolution of the difference between the target efficiency and the computed efficiency as a function of the iteration step.

FIG. 19 shows the coupling efficiency Ce of a grating and waveguide during the optimization of the second set of parameters of the grating in the method according to claim 1. The target coupling efficiency is given as a function of wavelength w: it is a Gaussian with standard deviation $\sigma$=300 nm and average value $\mu$=500 nm, with a peak coupling efficiency Ce=100% at w=500 nm. The optimization step minimizes the sum at every wavelength comprised between 360 nm and 830 nm of the squared differences between the computed coupling efficiency and the target efficiency. The grating shape is rectangular with a fill factor of 50%. The grating is coated with an enhancement layer of ZnS. The grating period P is constrained between 250 nm and 1000 nm, the grating depth d is constrained between 1 nm and 400 nm. The enhancement layer thickness L is constrained between 1 nm and 250 nm. The incident angle ($\theta$) is constrained between 0° and 10°, and its standard deviation (S$\theta$) is set to 0.5°. The starting to guess for the grating parameters are the following: P=500 nm, d=100 nm, L=100 nm and $\theta$=5°. After completion of the optimization—after 200 iterations—the resulting structure has the following parameters: P=406 nm, d=147 nm, L=176 nm and $\theta$=10°, and the coupling efficiency is shown in FIG. 19, FIG. 20 shows the evolution of the sum of squared difference between the target efficiency and the computed efficiency as a function of the iteration step in the optimization setup referred by FIG. 19.

If a parameter of the first parameter set according to this invention is not known a-priori, the method according to this invention can be applied for several choices of said parameter, and the best result, i.e. the one that results in the minimal difference between the target efficiency and the computed efficiency, is found by trial-and-error.

Figure 21:
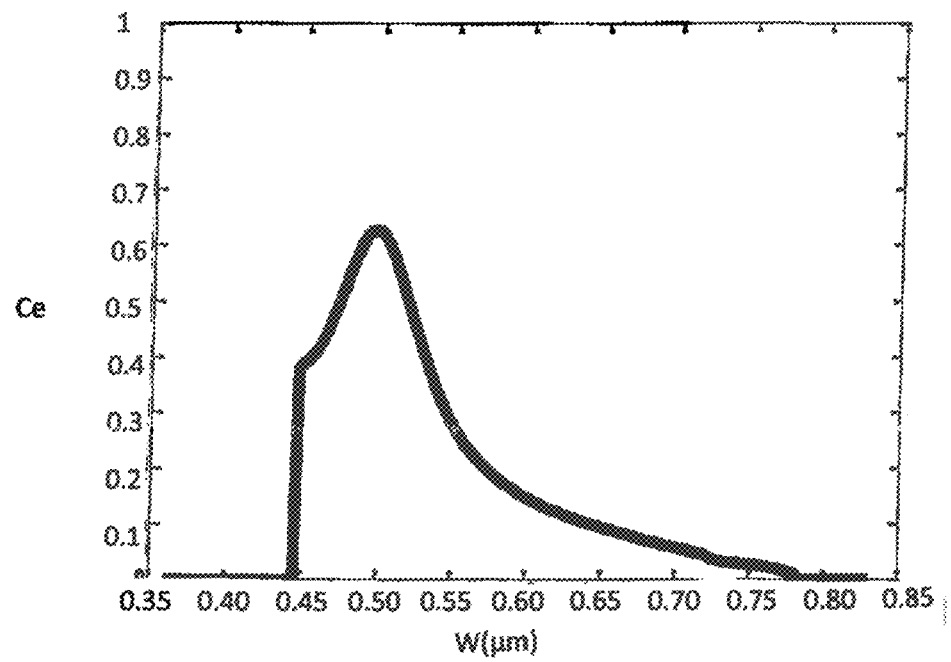
FIG. 21 shows the coupling efficiency of a grating according to claim 1 optimized for a TE polarized incident light beam.
Figure 22:
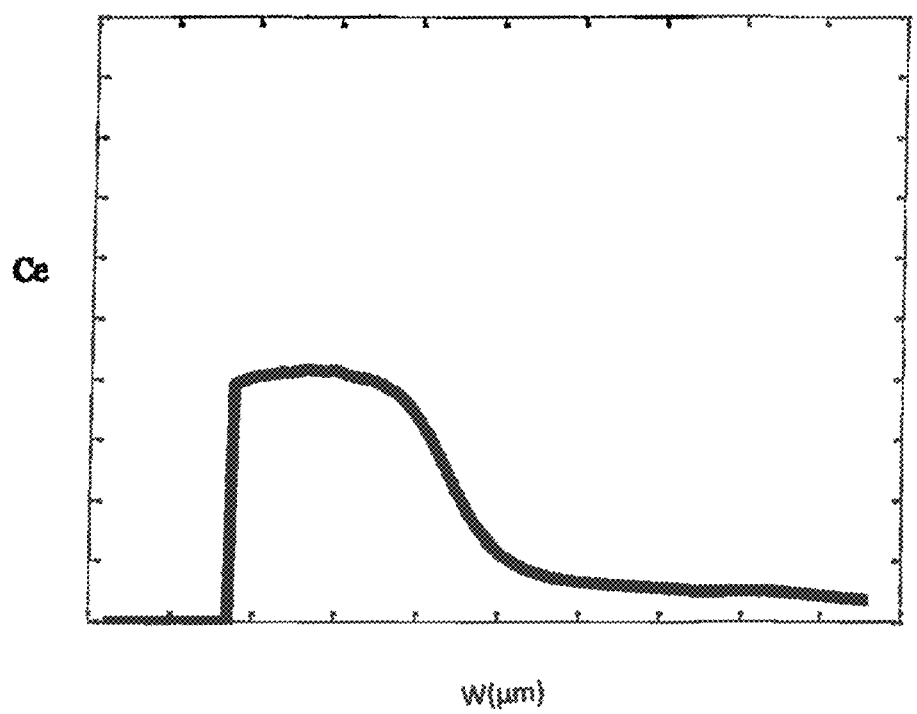
FIG. 22 shows the coupling efficiency of a grating according to claim 1 optimized for a TM polarized incident light beam.

FIGS. 21 and 22 show the coupling efficiency (Ce) for the first diffraction order obtained by the method according to claim 2, i.e. the method described above for a light coupling system with a rectangular pattern with an uncoated grating. The grating is made of Polycarbonate (PC), which has an approximate refraction n3=1.57. The target wavelength is a Gaussian with a mean value of 500 nm and a standard deviation of 30 nm. The incident angle $\theta$ is constrained between −40° and 40°. The grating is rectangular shaped. In FIG. 21, the optimization is carried out for an polarized incident light TE, parallel to the grating structures, and results in a grating with period P=586 nm, a depth d=271 nm, incident angle $\theta$=13.6°, a fill factor (A/P)=0.41, and a coupling efficiency Ce that reaches 63% in its peak value. In FIG. 22, the optimization is carried out for a polarized incident light TM, perpendicular to the grating structures, and results in a grating with period P=942 nm, a depth d=395 nm, an incident angle $\theta$=32.5°, a fill factor (A/P) =0.39, and a coupling efficiency Ce that reaches 42% in its peak value.

Figure 23:
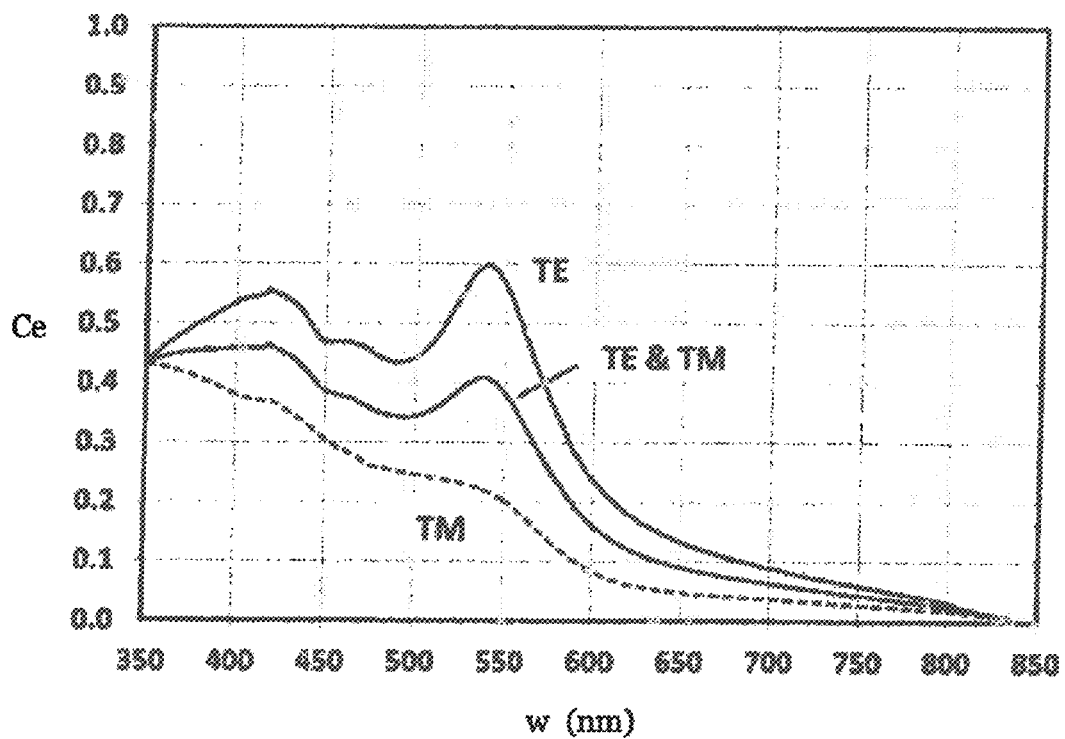
FIG. 23 shows the coupling efficiency for TE and TM polarized light of a grating according to claim 1 optimized for an unpolarized (TE & TM) incident light beam.

FIG. 23 shows the coupling efficiency (Ce) for the first diffraction order obtained by a method according to claim 2, with an uncoated grating. The grating is made of Polycarbonate (PC), which has an approximate refraction n3=1.57. The target wavelength is a Gaussian with a mean value of 532 nm and a standard deviation of 30 nm. The incident angle $\theta$ is constrained between −40° and 40°. The grating is rectangular shaped. FIG. 23 shows the resulting coupling efficiency for TE, TM and (TE & TM), but performs the optimization for both polarizations (TE & TM), which is the equivalent of performing an optimization for unpolarized light. It results in a grating with period P=638 nm, a depth d=321 nm, an incident angle $\theta$=14.9°, a fill factor (A/P)=0.43, and a coupling efficiency Ce that reaches 41% in its peak value. FIG. 24 shows a typical ZnS enhancement coating used for the efficient coupling of unpolarized light.

Figure 25:
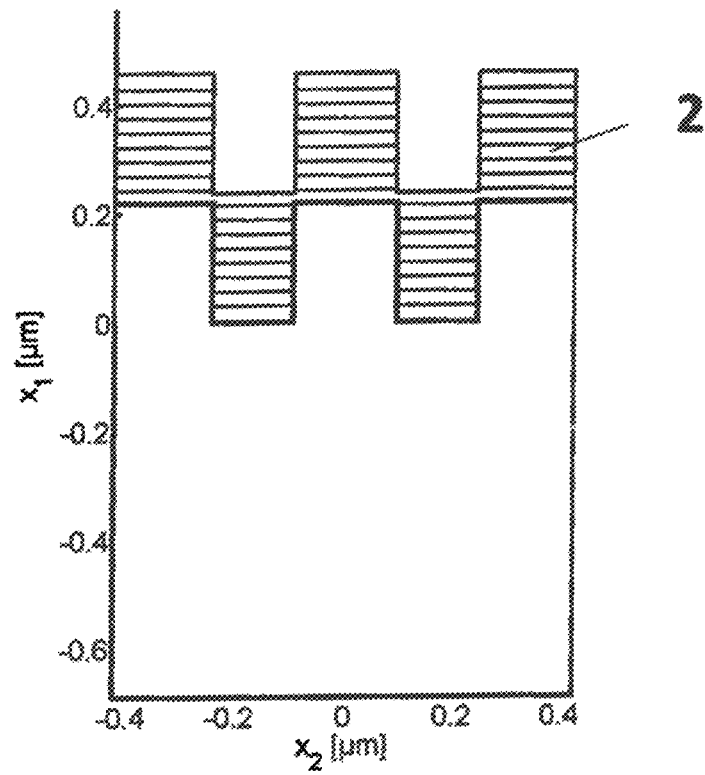
FIG. 25 shows the coupling efficiency of a ZnS grating optimized for a blue and unpolarized (TE and TM polarization) incident light beam having an incidence angle of 14°.
Figure 25:
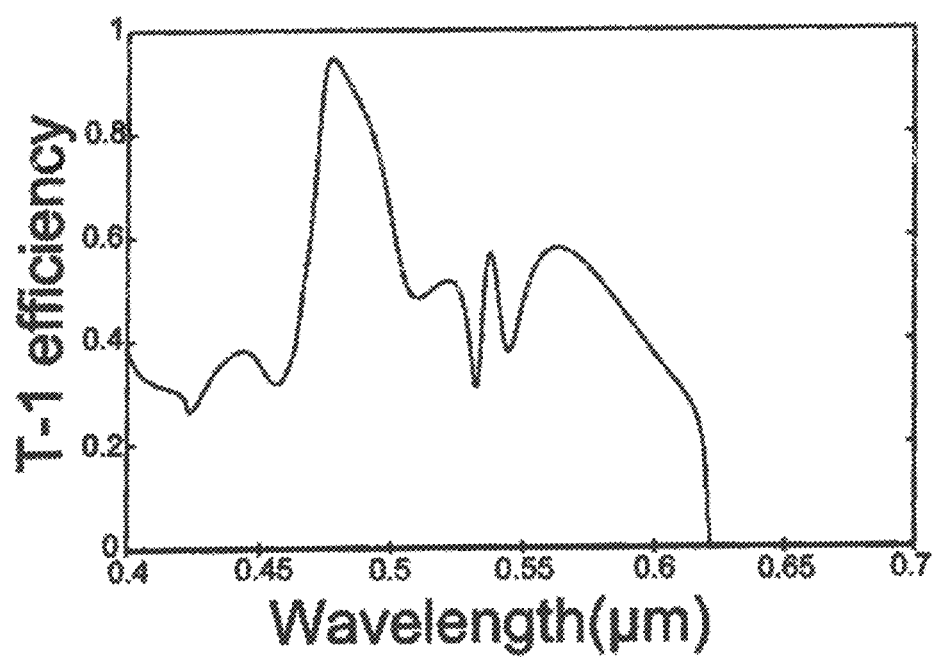

FIGS. 25 to 30 show more results obtained by the optimization method for different wavelengths, different incidence angles and for unpolarized light. The structures obtained are optimized for unpolarized light and are therefore optimized for any incident light beam, having only one polarization, any linear polarization, a circular or ellipsoidal polarization and any time-dependent or position-dependent polarization. In particular, FIG. 25 shows a ZnS enhancement coating optimized for an incidence angle of 14° for blue (450-495 nm) and unpolarized light, i.e. the TE and TM components of the incident light beam have the same amplitudes. In this case (FIG. 25) case the ZnS layer thickness is 240 nm, evaporated on a 340 nm period and 220 nm deep, 0.56 fill factor grating realized on PC.

Figure 26:
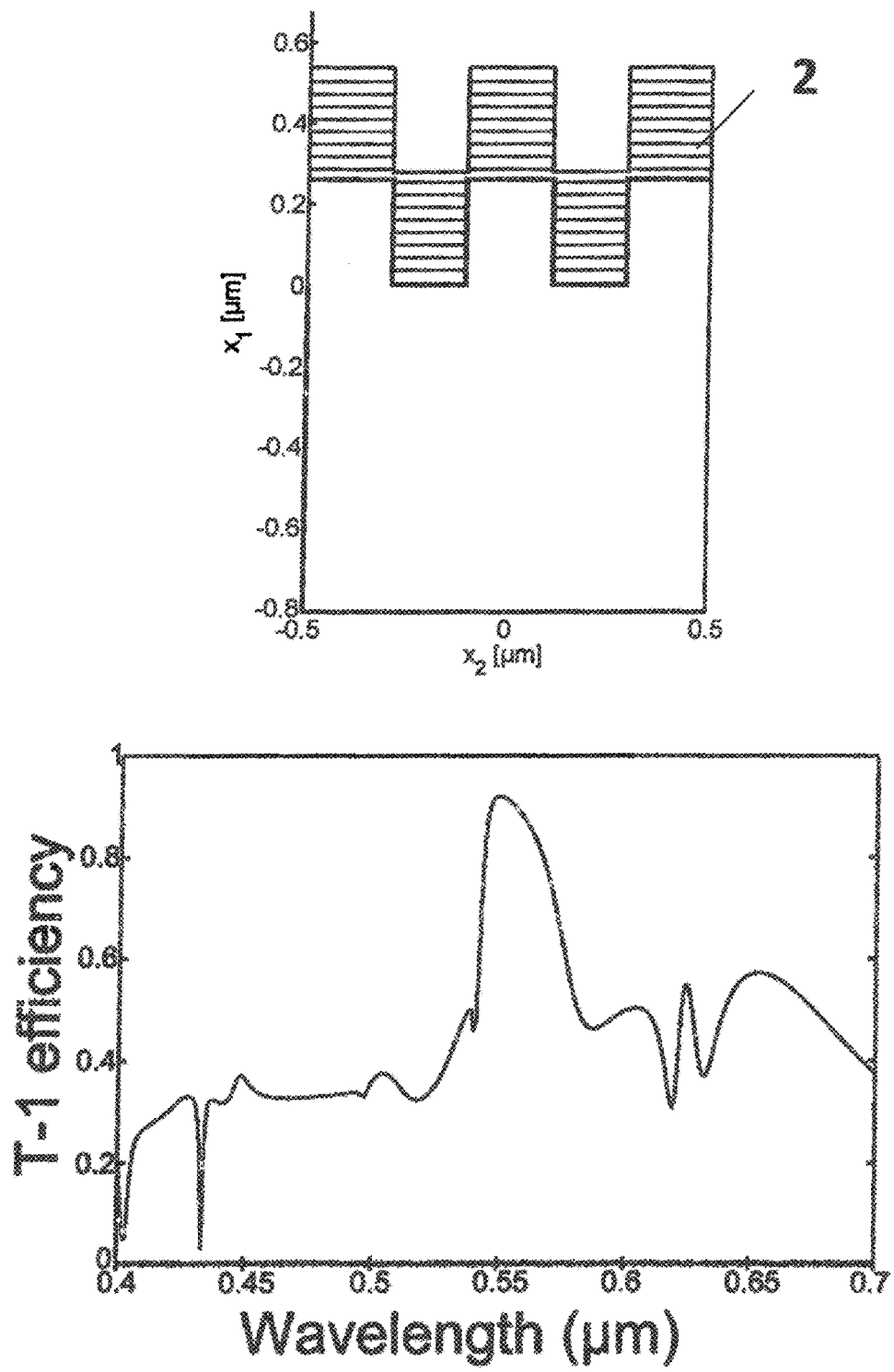
FIG. 26 shows the coupling efficiency of a ZnS grating optimized for a green and unpolarized (TE and TM polarization) incident light beam having an incidence angle of 14°.

FIG. 26 shows a ZnS enhancement coating optimized for an incidence angle of 14° for green (460-485 nm) and unpolarized light. In this case (FIG. 26) case the ZnS layer thickness is 280 nm, evaporated on a 400 nm period and 260 nm deep, 0.54 fill factor grating realized on PC.

Figure 27:
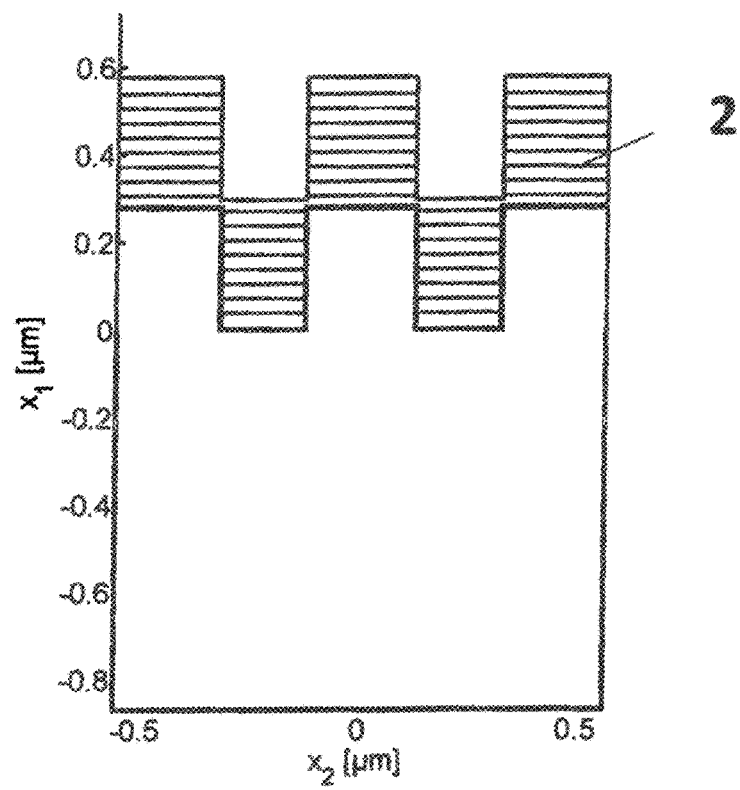
FIG. 27 shows the coupling efficiency of a ZnS grating optimized for a red and unpolarized (TE and TM polarization) incident light beam having an incidence angle of 14°.
Figure 27:
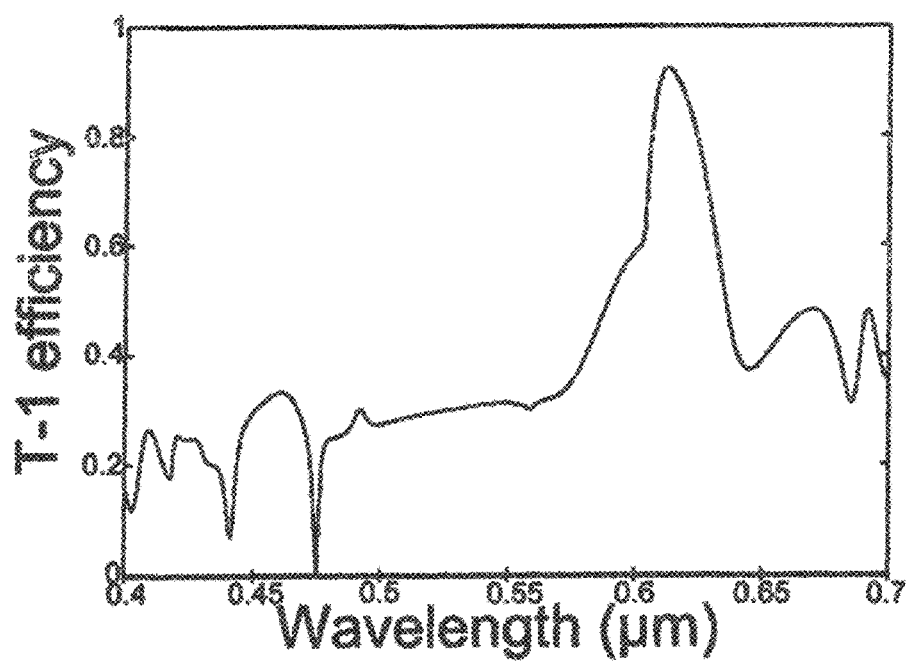

FIG. 27 shows a ZnS enhancement coating optimized for an incidence angle of 14° for red (600-640 nm) and unpolarized light. In this case (FIG. 27) case the ZnS layer thickness is 300 nm, evaporated on a 450 nm period and 280 nm deep, 0.56 fill factor grating realized on PC.

Figure 28:
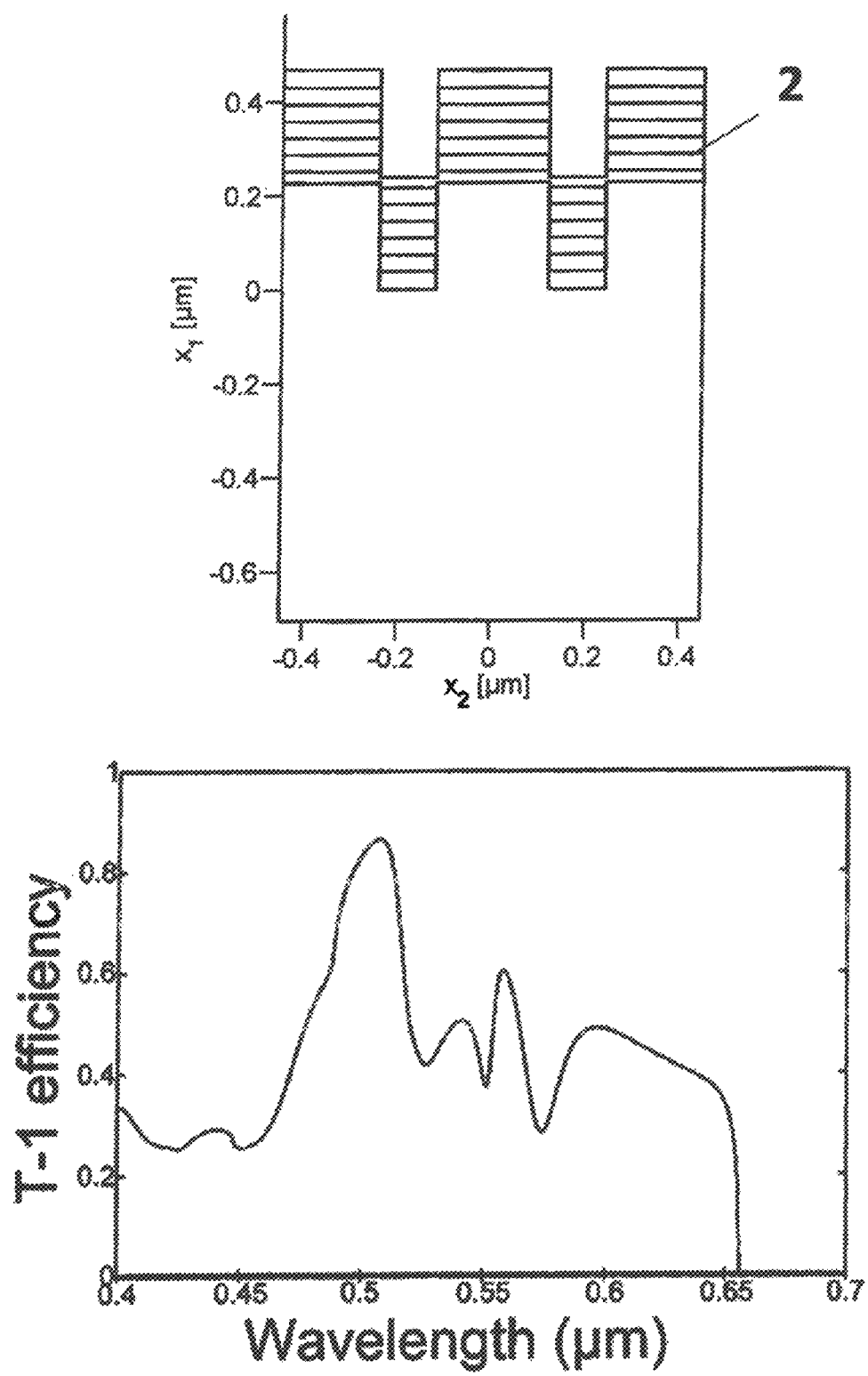
FIG. 28 shows the coupling efficiency of a ZnS grating optimized for a blue-green-red and unpolarized (TE and TM polarization) incident light beam having an incidence angle of 14°.

FIG. 28 shows a ZnS enhancement coating optimized for an incidence angle of 15° for blue-green-red and unpolarized light. In this case (FIG. 28) case the ZnS layer thickness is 240 nm, evaporated on a 360 nm period and 230 nm deep, 0.66 fill factor grating realized on PC.

It is possible to perform a medium level or high level optimization. In the case of a medium level optimization the efficiency will be acceptable while the devices will be easy to produce and fabricate thanks to their low aspect ratio, while for a high level optimization the efficiency will be maximal but the cost and effort will be higher as the manufacturing tolerances are tighter. Examples of both possibilities are summarized in the table of FIG. 29.

Figure 30:
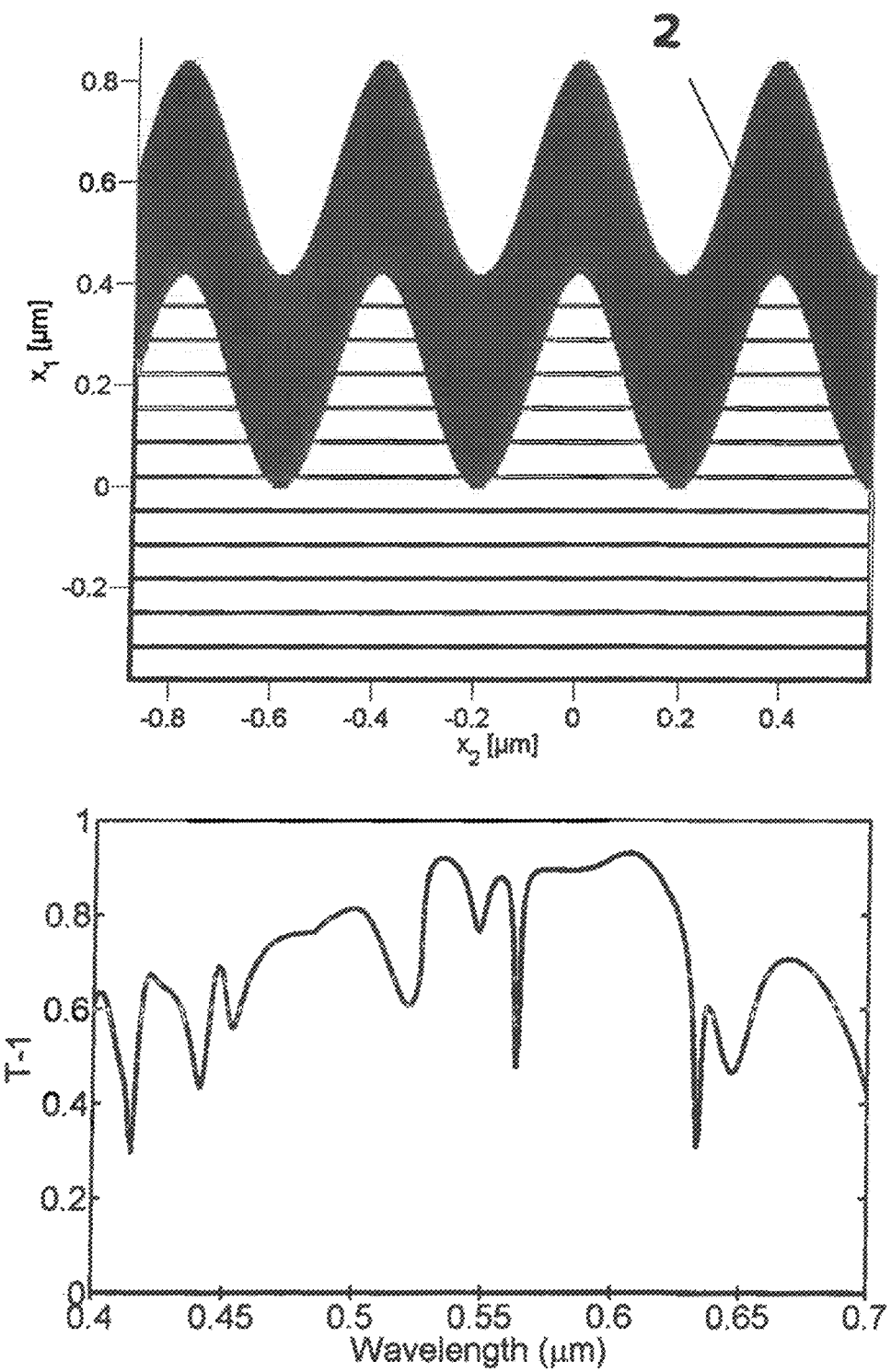
FIG. 30 shows the coupling efficiency of a sinusoidal grating optimized for a blue-green-red and unpolarized. (TE and TM polarization) incident light beam having an incidence angle of 14°.

Finally, FIG. 30 shows the obtained efficiency in case of a sinusoidal grating for an incidence angle of 17° and for red (615-630 nm), green (560-575 nm) and blue (460-480 nm). The sinusoidal depth of the sinusoidal grating (FIG. 30) is smaller than 1 period, the period is 390 nm, the ZnS coating thickness is 350 nm and the ZnS coating is deposited on PC. When the sinusoidal grating of FIG. 30 is illuminated, the diffracted light beam has a flat spectrum in the visible range and appears white to an observer.

All embodiments and application examples have been described with reference to the optical field. This does not represent a restriction of the applicability of the method and the device herein described above may by applied to other frequency domains of the electromagnetic spectrum. Those familiar with the art in medium and far infrared, deep ultraviolet, millimeter waves, terahertz waves and microwaves will easily adapt the described embodiments to the materials, scales and technologies pertaining to each of these spectral domains, although these do not fall within the scope of the present claims.

All embodiments of the present invention have been made with reference to planar substrates. This does not represent a limitation to planar surfaces. Those familiar with the art will easily adapt the described embodiments to curved surfaces.

What is claimed is:

1. A method for constructing a light coupling system wherein a grating is manufactured on an incident light surface of a multimode waveguide, said grating defining the entrance of the multimode waveguide for an incident light beam, said grating comprising a repetition of patterns, said method comprising a step of choosing a first set of parameters comprising
    wavelength distribution of the incident light to be transmitted by the multimode waveguide, said wavelength distribution being at least 40 nm,
    polarized or unpolarized nature of said incident light,
    incident angle standard deviation of the incident light with respect to the multimode waveguide,
    shape of the patterns, which is designed to have its local surface normal (Ns), in any location of said shape, making an angle ($\alpha$) with respect to the average normal (N) of the surface of the multimode waveguide, said angle ($\alpha$) being comprised between $\alpha=-90°$ and $\alpha=90°$, refractive index (n1) of the medium surrounding the multimode waveguide,
    multimode waveguide refractive index (n3),
    said grating being defined by a second set of parameters comprising
    grating period (P), separating two adjacent patterns,
    grating depth (d) between the highest and the lowest point of the pattern,
    incident angle mean value (0) of the incident light with respect to the normal to said entrance of the multimode waveguide,
    said method comprises a step of optimization of the second set of parameters to obtain an optimized second set of parameters,
    said step of optimization being performed to obtain a transmission efficiency (Ce) of the incident light crossing through the grating into said multimode waveguide for the first or the second diffractive order exceeding 35% for unpolarized light, or exceeding 50% for polarized light, over at least the wavelength distribution of the incident light beam as defined in the chosen first set of parameters, said grating having a length (D) measured on the incident light surface of the multimode waveguide in the direction of the diffracted beam, said length (D) being related to the thickness (WT) of the multimode waveguide and to the angle $\beta$ between the multimode waveguide surface normal and the light beam inside the multimode waveguide, said length D being defined by the following inequality:

$$D \leq 2 \cdot WT \cdot \tan \beta$$

said method comprising a step of manufacturing the grating on the surface of the multimode waveguide according to the chosen first set of parameters and to said optimized second set of parameters.

2. The method of claim 1, wherein the shape of said patterns is rectangular, and wherein said optimization step comprises the optimization of the rectangular fill factor (A/P) defined as the width of a rectangle (A) compared to the grating period (P).

3. The method of claim 1, wherein said grating is covered by an enhancement layer whose refractive index (n2) belongs to the first set of parameters, and whose thickness (L) belongs to the second set of parameters, and wherein
    the optimization step comprises the optimization of said layer thickness (L), and
    n2-n1 is greater or equal to 0.3, and
    n2-n3 is greater or equal to 0.3.

4. The method of claim 2, wherein said grating is covered by an enhancement layer whose refractive index (n2) belongs to the first set of parameters, and whose thickness (L) belongs to the second set of parameters, and wherein
    the optimization step comprises the optimization of said layer thickness (L), and
    n2-n1 is greater or equal to 0.3, and
    n2-n3 is greater or equal to 0.3.

5. The method of claim 3, wherein the optimization step is designed to obtain a transmission efficiency of the incident light into said waveguide for the first or the second diffractive order exceeding 50% at a given wavelength of the incident light.

6. The method of claim 4, wherein the optimization step is designed to obtain a transmission efficiency of the incident light into said waveguide for the first or the second diffractive order exceeding 50% at a given wavelength of the incident light.

7. A light coupling system, obtainable by the method of claim 1, for coupling an incident light beam into a multimode waveguide, to be used in an optical system that comprises a polarized or an unpolarized light source with a given wavelength distribution, said optical system being immersed in a medium with refractive index n1,
    said light coupling system comprising
    a multimode waveguide,
    a grating manufactured on the incident light surface of said multimode waveguide, which defines the entrance of said multimode waveguide for the incident light beam,
    said grating comprising a repetition of patterns, that have its local surface normal (Ns), in any location of said shape, making an angle ($\alpha$) with respect to the average normal (N) of the surface of the multimode waveguide, said angle ($\alpha$) being comprised between $\alpha=-90°$ and $\alpha=90°$,
    said light coupling system being defined by a set of parameters comprising
    grating period (P), separating two adjacent patterns,
    grating depth (d) between the highest and the lowest point of the pattern,
    waveguide refractive index (n3),
    wherein
    said grating has a length (D), measured on the incident light surface of said multimode waveguide in the direction of the diffracted beam, said length (D) being related to the thickness (WT) of the multimode waveguide and to the angle β between the multimode waveguide surface normal and the light beam inside said multimode waveguide, said length D being defined by the following inequality:

$$D \leq 2 \cdot WT \cdot \tan \beta$$

and said set of parameters is optimized to obtain a transmission efficiency (Ce) of the incident light beam into said waveguide for the first or the second diffractive order that exceeds 35% for unpolarized light or that exceeds 50% for polarized light over at least the wavelength distribution of the incident light beam as defined in the chosen first set of parameters, said incident light beam having a wavelength distribution being at least 40 nm.

8. The light coupling system of claim 7, wherein the multimode waveguide is made of Glass, or Quartz, or Polymer, or SolGel.

9. The light coupling system of claim 7, wherein the multimode waveguide is made of Polycarbonate (PC) or Polymethyl methacrylate (PMMA) or Polyethylene terephthalate (PET).

10. The light coupling system according to claim 7, wherein the shape of the patterns is rectangular and wherein the fill factor (A/P), defined as the width of a rectangle (A) compared to the grating period (P), is between 10% and 90%.

11. The light coupling system according to claim 7, comprising
an enhancement layer with refractive index n2,
wherein n2-n1 is greater or equal to 0.3 and
wherein n2-n3 is greater or equal to 0.3,
and wherein said enhancement layer thickness (L) is optimized as an additional parameter in said parameter set in order to obtain a transmission efficiency for the first or the second diffractive order exceeding 50% at a given wavelength of the incident light beam.

12. The light coupling system according to claim 11, wherein the enhancement layer comprises at least one of ZnS, or TiO2, or HfO2, or Ta2O5, or ZrO2, or AlN, or Al2O3 or ZnO or any combination of these materials.

13. The light coupling system according to claim 7, wherein said grating depth (d) between the highest and the lowest point of the patterns is comprised between 10 nm and 1000 nm.

14. The light coupling system according to claim 11, wherein said grating depth (d) between the highest and the lowest point of the patterns is comprised between 10 nm and 1000 nm.

15. The light coupling system according to claim 7, wherein the grating is manufactured on the incident light surface and wherein the waveguide thickness (WT) is larger or equal to 1 micron.

16. The light coupling system according to claim 11, wherein the grating is manufactured on the incident light surface and wherein the waveguide thickness (WT) is larger or equal to 1 micron.

17. The light coupling system according to claim 11, wherein the thickness (L) of the enhancement layer is comprised between 10 nm and 500 nm.

18. The light coupling system according to claim 7, for coupling light with a wavelength comprised between 400 nm and 700 nm, wherein the grating period (P), separating two adjacent patterns, is between 230 nm and 840 nm.

19. The light coupling system according to claim 11, for coupling light with a wavelength comprised between 400 nm and 700 nm, wherein the grating period (P), separating two adjacent patterns, is between 230 nm and 840 nm.

20. The light coupling system according to claim 7, for coupling light with a wavelength comprised between 700 nm and 2500 nm, wherein the grating period (P), separating two adjacent patterns, is between 580 nm and 3000 nm.

21. The light coupling system according to claim 11, for coupling light with a wavelength comprised between 700 nm and 2500 nm, wherein the grating period (P), separating two adjacent patterns, is between 580 nm and 3000 nm.

22. The light coupling system according to claim 7, for coupling light with a wavelength comprised between 250 nm and 400 nm, wherein the grating period (P), separating two adjacent patterns, is comprised between 180 nm and 560 nm.

23. The light coupling system according to claim 11, for coupling light with a wavelength comprised between 250 nm and 400 nm, wherein the grating period (P), separating two adjacent patterns, is between 180 nm and 560 nm.

* * * * *